US011038861B2

(12) United States Patent
Agarwal et al.

(10) Patent No.: US 11,038,861 B2
(45) Date of Patent: Jun. 15, 2021

(54) TECHNIQUES FOR SECURITY ARTIFACTS MANAGEMENT

(71) Applicant: Oracle International Corporation, Redwood Shores, CA (US)

(72) Inventors: Amit Agarwal, Milpitas, CA (US); Srikant Krishnapuram Tirumalai, Milpitas, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/211,540

(22) Filed: Dec. 6, 2018

(65) Prior Publication Data

US 2019/0109831 A1 Apr. 11, 2019

Related U.S. Application Data

(63) Continuation of application No. 15/136,734, filed on Apr. 22, 2016, now Pat. No. 10,171,437.

(Continued)

(51) Int. Cl.
*H04L 29/06* (2006.01)

(52) U.S. Cl.
CPC .............. *H04L 63/06* (2013.01); *H04L 63/10* (2013.01); *H04L 63/20* (2013.01)

(58) Field of Classification Search
CPC ......... H04L 63/20; H04L 63/10; H04L 63/06; G06F 21/10; G06F 21/6218;

(Continued)

(56) References Cited

U.S. PATENT DOCUMENTS 6,158,010 A * 12/2000 Moriconi .............. G06F 21/552
                                                      709/223
6,327,652 B1   12/2001 England
(Continued)

FOREIGN PATENT DOCUMENTS

CN            104462982 A    5/2015

OTHER PUBLICATIONS

"About Active Directory Group Policy Container Settings", Accessed Oct. 14, 2018, https://www.vmware.com/support/vcm/doc/help/vcm581/Content/ActiveDir_CS/AD_Group_Policy_Objects.htm, 1 page.

(Continued)

*Primary Examiner* — Sher A Khan
(74) *Attorney, Agent, or Firm* — Kilpatrick Townsend & Stockton LLP

(57) ABSTRACT

Techniques are provided to manage security artifacts. Specifically, a security management system is disclosed for implementing security artifact archives to manage security artifacts. A security artifact archive may include information for managing one or more security artifacts that can be referenced or included in the security artifact archive. The security management system can create, edit, read, send, and perform other management operations for security artifact archives. Objects can be bundled in an object-specific security artifact archive. Security artifact archives may be named, versioned, tagged and/or labeled for identification. Security artifact archives may be transmitted to a destination (e.g., a service provider or a client system) that provides access to an object whose access is dependent on security artifacts. The destination may can manage access to the object using a security artifact archive that includes relevant and current security artifacts for the object.

20 Claims, 11 Drawing Sheets

Related U.S. Application Data

(60) Provisional application No. 62/152,681, filed on Apr. 24, 2015.

(58) Field of Classification Search
CPC ............ G06F 2221/2113; G06F 21/51; G06F 21/629; G06F 21/44; G06F 21/62; G06F 21/6227
See application file for complete search history.

(56) References Cited

U.S. PATENT DOCUMENTS

| | | | |
|---|---|---|---|
| 6,820,063 B1* | 11/2004 | England | G06F 21/10 705/50 |
| 7,472,422 B1* | 12/2008 | Agbabian | H04L 41/06 726/25 |
| 7,673,323 B1 | 3/2010 | Moriconi | |
| 7,900,243 B2* | 3/2011 | Ramakrishna | G06F 21/10 726/7 |
| 7,913,309 B2 | 3/2011 | Starostin et al. | |
| 7,958,226 B2* | 6/2011 | Bernardi | H04L 29/12207 709/224 |
| 8,688,991 B1 | 4/2014 | Sunil | |
| 8,843,734 B2 | 9/2014 | Lim | |
| 8,959,579 B2 | 2/2015 | Barton et al. | |
| 9,003,141 B2* | 4/2015 | Nielsen | G06F 11/1438 711/162 |
| 9,064,131 B2 | 6/2015 | Lim et al. | |
| 9,413,778 B1* | 8/2016 | Elisha | H04L 63/20 |
| 9,471,798 B2 | 10/2016 | Vepa et al. | |
| 9,519,696 B1 | 12/2016 | Roth et al. | |
| 9,614,851 B1* | 4/2017 | Vevle | H04L 63/10 |
| 9,858,428 B2 | 1/2018 | Barton et al. | |
| 9,882,909 B2 | 1/2018 | Awan et al. | |
| 10,104,086 B2 | 10/2018 | Manjunath et al. | |
| 10,142,371 B2 | 11/2018 | Sastry et al. | |
| 10,171,437 B2 | 1/2019 | Agarwal et al. | |
| 10,230,732 B2 | 3/2019 | Vepa et al. | |
| 10,395,042 B2 | 8/2019 | Agarwal et al. | |
| 2002/0059471 A1 | 5/2002 | Sanghvi et al. | |
| 2002/0116406 A1* | 8/2002 | Goldick | G06F 16/10 |
| 2002/0169974 A1 | 11/2002 | McKune | |
| 2002/0188568 A1 | 12/2002 | Nickolaisen et al. | |
| 2003/0081621 A1 | 5/2003 | Godfrey et al. | |
| 2003/0115322 A1 | 6/2003 | Moriconi et al. | |
| 2004/0107360 A1* | 6/2004 | Herrmann | H04L 63/08 726/1 |
| 2005/0038881 A1* | 2/2005 | Ben-Itzhak | G06F 21/55 709/223 |
| 2005/0060549 A1* | 3/2005 | England | G06F 21/10 713/175 |
| 2005/0125494 A1* | 6/2005 | Horii | H04L 63/145 709/203 |
| 2005/0132226 A1 | 6/2005 | Wheeler et al. | |
| 2005/0240558 A1* | 10/2005 | Gil | G06F 16/972 |
| 2005/0273600 A1 | 12/2005 | Seeman | |
| 2006/0059537 A1 | 3/2006 | Alvermann et al. | |
| 2006/0106825 A1 | 5/2006 | Cozzi | |
| 2006/0265758 A1 | 11/2006 | Khandelwal et al. | |
| 2007/0143148 A1 | 6/2007 | Kol et al. | |
| 2007/0192834 A1* | 8/2007 | Song | H04N 21/8166 726/3 |
| 2008/0133972 A1* | 6/2008 | Verbowski | G06F 21/57 714/37 |
| 2008/0134297 A1 | 6/2008 | Clinick et al. | |
| 2008/0148067 A1* | 6/2008 | Sitrick | H04L 9/0891 713/193 |
| 2009/0031286 A1* | 1/2009 | Yee | G06Q 10/06 717/120 |
| 2009/0325566 A1 | 12/2009 | Bell et al. | |
| 2010/0104099 A1 | 4/2010 | Kim | |
| 2010/0154025 A1 | 6/2010 | Esteve et al. | |
| 2010/0257372 A1 | 10/2010 | Seifert | |
| 2010/0293147 A1 | 11/2010 | Snow et al. | |
| 2011/0023123 A1* | 1/2011 | King | G06F 21/105 726/26 |
| 2011/0029555 A1* | 2/2011 | Gao | G06F 21/10 707/769 |
| 2011/0131275 A1* | 6/2011 | Maida-Smith | G06F 21/6209 709/204 |
| 2011/0296393 A1* | 12/2011 | Vidal | G06F 8/65 717/171 |
| 2012/0036220 A1 | 2/2012 | Dare et al. | |
| 2012/0036370 A1 | 2/2012 | Lim et al. | |
| 2012/0036552 A1 | 2/2012 | Dare et al. | |
| 2012/0131164 A1* | 5/2012 | Bryan | G06F 21/604 709/223 |
| 2012/0198041 A1 | 8/2012 | Black et al. | |
| 2012/0198559 A1* | 8/2012 | Venkata Naga Ravi | G06F 21/6209 726/26 |
| 2012/0221955 A1 | 8/2012 | Raleigh et al. | |
| 2012/0260303 A1 | 10/2012 | Wollnik et al. | |
| 2013/0007245 A1 | 1/2013 | Malik et al. | |
| 2013/0073672 A1 | 3/2013 | Ayed | |
| 2013/0086626 A1 | 4/2013 | Kavantzas et al. | |
| 2013/0159704 A1* | 6/2013 | Chandrasekaran | H04L 9/0897 713/156 |
| 2013/0174216 A1 | 7/2013 | Simske et al. | |
| 2013/0231093 A1* | 9/2013 | Toy | H04W 4/00 455/414.1 |
| 2013/0232540 A1 | 9/2013 | Saidi et al. | |
| 2014/0007222 A1 | 1/2014 | Qureshi et al. | |
| 2014/0032691 A1 | 1/2014 | Barton et al. | |
| 2014/0040979 A1 | 2/2014 | Barton et al. | |
| 2014/0068273 A1 | 3/2014 | Sobel et al. | |
| 2014/0075568 A1 | 3/2014 | Sathyadevan et al. | |
| 2014/0109176 A1 | 4/2014 | Barton et al. | |
| 2014/0122677 A1* | 5/2014 | Hasegawa | G06F 21/105 709/223 |
| 2014/0173700 A1 | 6/2014 | Awan et al. | |
| 2014/0189777 A1 | 7/2014 | Viswanathan | |
| 2014/0211237 A1* | 7/2014 | Tsuchitoi | G06F 3/1285 358/1.14 |
| 2014/0236846 A1* | 8/2014 | Melika | G06Q 10/06 705/310 |
| 2015/0081538 A1* | 3/2015 | Renard | G06Q 20/3278 705/41 |
| 2015/0089575 A1 | 3/2015 | Vepa et al. | |
| 2015/0172321 A1 | 6/2015 | Kirti et al. | |
| 2015/0222637 A1 | 8/2015 | Hung et al. | |
| 2015/0381581 A1 | 12/2015 | Wang et al. | |
| 2016/0011990 A1 | 1/2016 | Berengoltz et al. | |
| 2016/0162695 A1 | 6/2016 | Scafaria et al. | |
| 2016/0232374 A1 | 8/2016 | Huang et al. | |
| 2016/0285835 A1 | 9/2016 | Linga et al. | |
| 2016/0315926 A1 | 10/2016 | Agarwal et al. | |
| 2016/0315943 A1 | 10/2016 | Manjunath et al. | |
| 2016/0315965 A1 | 10/2016 | Sastry et al. | |
| 2017/0004312 A1 | 1/2017 | Agarwal et al. | |
| 2017/0004313 A1 | 1/2017 | Agarwal et al. | |
| 2017/0006064 A1 | 1/2017 | Agarwal et al. | |
| 2017/0019408 A1 | 1/2017 | Vepa et al. | |
| 2017/0078721 A1 | 3/2017 | Brockmann et al. | |
| 2017/0142076 A1 | 5/2017 | Ford et al. | |
| 2017/0147825 A1 | 5/2017 | Barton et al. | |
| 2017/0174276 A1 | 6/2017 | Sibilleau | |
| 2017/0201850 A1 | 7/2017 | Raleigh et al. | |
| 2018/0025180 A1 | 1/2018 | Wang et al. | |
| 2018/0027006 A1 | 1/2018 | Zimmermann et al. | |
| 2018/0109538 A1 | 4/2018 | Kumar et al. | |

OTHER PUBLICATIONS

Mar-Elia, Darren, "What's Wrong with Group Policy?", IT Pro Today, Jun. 14, 2011, https://www.itprotoday.com/compute-engines/whats-wrong-group-policy. 14 pages.

Srachui, "Group Policy Basics—Part 1: Understanding the Structure of a Group Policy Object—Midnight Musings of a Technical TAM", Feb. 13, 2012 https://Blogs.technet.microsoft.com/musings_

(56) References Cited

OTHER PUBLICATIONS of_a_technical_tam/2012/02/13/group-policy-basics-part-1-understanding-the-structure-of-a-group-policy-object/. 10 pages.
"Understanding Group Policy Storage", sdmsoftware, Accessed Oct. 14, 2018, https://sdmsoftware.com/gpoguy/whitepapers/understanding-group-policy-storage/, 3 pages.
U.S. Appl. No. 14/974,836 a Non-Final Office Action, dated Aug. 11, 2017, 15 pages.
U.S. Appl. No. 14/974,836 an Advisory Action, dated Mar. 22, 2018, 3 pages.
U.S. Appl. No. 14/974,836 a Final Office Action, dated Dec. 27, 2017 15 pages.
U.S. Appl. No. 14/974,836 a Notice of Allowance, dated Jul. 30, 2018, 8 pages.
U.S. Appl. No. 14/975,208 Notice of Allowance, dated Jun. 21, 2018, 7 pages.
U.S. Appl. No. 14/975,208 a First Action Interview Pilot Program Pre-Interview Communication dated Dec. 15, 2017, 5 pages.
U.S. Appl. No. 15/197,463 a Non-Final Office Action dated Feb. 9, 2018, 22 pages.
U.S. Appl. No. 15/197,463 a Final Office Action dated Jun. 29, 2018, 24 pages.
U.S. Appl. No. 15/197,463 an Advisory Action dated Sep. 12, 2018, 3 pages.
U.S. Appl. No. 15/197,478 a Non-Final Office Action dated Feb. 7, 2018, 21 pages.
U.S. Appl. No. 15/136,734 a First Action Interview Office Action Summary dated May 1, 2018, 7 pages.
U.S. Appl. No. 15/197,463 an Applicant Initiated Interview Summary dated May 11, 2018, 3 pages.
U.S. Appl. No. 15/197,478 an Applicant Initiated Interview Summary dated May 11, 2018, 3 pages.
U.S. Appl. No. 15/278,902 a Notice of Allowance, dated Oct. 24, 2018, 11 pages.
U.S. Appl. No. 15/278,902 an Advisory Action, dated Jul. 13, 2018, 3 pages.
U.S. Appl. No. 15/278,902 a Non-Final Office Action, dated Aug. 31, 2017, 19 pages.
U.S. Appl. No. 15/278,902 a Final Office Action dated Apr. 20, 2018, 21 pages.
U.S. Appl. No. 15/197,472 a First Action Interview Office Action Summary dated May 1, 2018, 4 pages.
U.S. Appl. No. 14/484,050 a Non-Final Office Action dated Jan. 4, 2016, 14 pages.
U.S. Appl. No. 14/484,050 a Notice of Allowance dated Jun. 2, 2016, 8 pages.
U.S. Appl. No. 15/136,734 a Notice of Allowance dated Aug. 28, 2018, 12 pages.
U.S. Appl. No. 15/136,734 a Preinterview First Office Action dated Mar. 5, 2018, 6 pages.
U.S. Appl. No. 14/975,208, First Action Interview Pilot Program Pre-Interview Communication dated Jun. 16, 2017, 3 pages.
U.S. Appl. No. 15/197,463, Non-Final Office Action dated Nov. 20, 2018, 24 pages.
U.S. Appl. No. 15/197,472, Final Office Action dated Nov. 9, 2018, 17 pages.
U.S. Appl. No. 15/197,472, First Action Interview Office Action Summary dated Jul. 18, 2018, 6 pages.
U.S. Appl. No. 15/197,472, Non-Final Office Action dated Mar. 27, 2019, 19 pages.
U.S. Appl. No. 15/197,478, Advisory Action dated Sep. 13, 2018, 3 pages.
U.S. Appl. No. 15/197,478, Final Office Action dated Jun. 29, 2018, 24 pages.
U.S. Appl. No. 15/197,478, Non-Final Office Action dated Nov. 5, 2018, 25 pages.
U.S. Appl. No. 15/197,463, Final Office Action dated Apr. 24, 2019, 24 pages.
U.S. Appl. No. 15/197,478, Notice of Allowance dated Apr. 19, 2019, 18 pages.
U.S. Appl. No. 15/197,463, Notice of Allowance dated Jul. 18, 2019, 9 pages.
U.S. Appl. No. 15/197,472, Notice of Allowance dated Jul. 23, 2019, 10 pages.

\* cited by examiner

Security Artifact Archive 300

| Security Data 310 | | | | | |
|---|---|---|---|---|---|
| Access Management Data 312 | Object Data 314 | Version(s) 316 | Attribute(s) 318 | History 320 | Archive Reference(s) 322 |
| Policy(s) [Access Policy 1] Role(s) | Object Type: Application "Object 1" Object Type: Data "Object 2" | Version 1 | Artifact Type Tag(s) – "Mobile Application 1" | Security Artifact Archive History | Archive Reference 1 Archive Reference 2 |

Security Artifact Data 320

| 322 | 324 |
|---|---|
| Security Artifact 1 User name: Amit Password: Ktymgny76* | Security Artifact 2 Security Certificate: xht77762ammm |

FIG. 3

TECHNIQUES FOR SECURITY ARTIFACTS MANAGEMENT

CROSS-REFERENCES TO RELATED APPLICATIONS

This application is a continuation application of U.S. application Ser. No. 15/136,734, filed on Apr. 22, 2016, entitled, "TECHNIQUES FOR SECURITY ARTIFACTS MANAGEMENT," which claims the benefit and priority of U.S. Provisional Application No. 62/152,681, filed on Apr. 24, 2015, entitled "SYSTEM AND PROCESSES FOR SECURITY ARTIFACTS MANAGEMENT," both of which are herein incorporated by reference in their entirety for all purposes.

BACKGROUND

Enterprise systems have many users accessing different objects (e.g., a process, a service, an application, data, a hardware resource, or a computing resource) in an enterprise computing environment. Managing access to objects becomes a challenge as access can involve the use one or more security artifacts. A security artifact of an object can include data for securing access to the object. In an enterprise system having thousands of objects, administrators of the enterprise system may be burdened with having to manage thousands, if not more, security artifacts for objects.

Along with managing security artifacts comes the difficulty of maintaining compliance for policies configured for managing access using those artifacts. Users varying behavior may lead to security artifacts that are non-compliant. Access to an object may change throughout a development or a product life cycle during which the object is used. As such, access to the object may change such that new security artifacts may be created or existing security artifacts may be modified. Through a life cycle, users accessing the object may change. Security artifacts may be duplicate for objects that have a common or identical access policy. As a result, an enterprise computing environment may be overloaded with security artifacts.

The amount of security artifacts in an enterprise computing environment may affect the processing efficiency of an enterprise system having to sort through many artifacts. These issues and challenges lead to difficulties in managing a security artifact through the life of an object. Such difficulties may lead to disorganization and duplication of security artifacts. With the increase in security artifacts poses security risks for access to objects in an enterprise environment.

BRIEF SUMMARY

In certain embodiments, techniques are provided to manage security artifacts. Specifically, a security management system is disclosed for implementing security artifact archives to manage security artifacts. The security management system can manage security artifacts as a central repository for several clients and service providers. Security artifacts may be obtained from the security management system upon request or through a subscription process. A security artifact archive may include information for managing one or more security artifacts that can be referenced or included in the security artifact archive. Because a security artifact archive can manage multiple security artifacts, a security artifact archive can been viewed as a "security artifact bundle". The security management system can create, edit, read, send, and perform other management operations for security artifact archives.

A security artifact can include data related to securing access to an object in an enterprise computing environment. A security artifact archive may be created to manage security access for one or more objects. The security artifact archive may be created based on input from a user, information from a provider of an object, and/or other information accessible from an access management system. All or part of a security artifact archive can be transmitted to a destination, such as a client system or a provider system that manages access to objects. The destination to which the security artifact archive is sent can manage access to objects using information indicated by the security artifact archive. The destination can send information to the security management system to update the security artifact archive and/or to create new versions of the security artifact archive.

The security management system may manage security for accessing objects. As such, a security artifact archive can be stored in association with the objects that are protected. In some embodiments, a security artifact archive may be modified to protect access to several related objects or objects that share security artifacts. A security artifact archive can be created for a specific object or types of objects (e.g., application-specific). A security artifact archive may store information about the scope of access and may be defined such that it includes a name, a version, a tag, or other information about the objects that are protected. Security artifact archives may be managed with respect to life cycle management (LCM) for objects as a part of a product or service. LCM may be applied to security artifact archives to create, version, delete, and otherwise manage security artifact archives for products or services.

In some embodiments, a recipient (e.g., clients and service providers) can request the security management system to provide security artifacts periodically. Requests can indicate criteria for which security artifacts are requested. The security artifacts may be identified based on the criteria and then bundled into one or more security artifact archives. Security artifacts may be requested according to a schedule. The schedule may be specified by the recipient. Security artifact archives may be sent according to the schedule as well as updates to those security artifact archives. In some embodiments, the security management system can provide a subscription service, such that security artifact archives are provided based on the subscription. Security artifact archives may be pushed to recipients or pulled by the recipients. Recipients can aggregate security artifact archives to be managed locally for access to objects.

By decoupling management of security artifacts to a central management system, e.g., a security management system, service providers and client systems can reduce, if not eliminate, the burden of managing security artifacts in a fine-grain manner. In an enterprise environment having thousands of users coupled with thousands of objects, managing security for individual objects becomes a challenge. Specifically, as an enterprise changes its security policies and LCM changes for objects, the enterprise is burdened with having to adjust security access for individual changes to objects during a life cycle of a product or a service.

A security management system can aggregate access management data along with existing security artifacts to produce security artifact archives. The security artifact archives can be customized and configured in many ways, for example, specific to a group of users (e.g., a role), types of objects (e.g., applications), policies, levels of security, LCM, or a combination thereof. Security artifact archives may be associated based on a relationship, such as versioning or sharing common security features (e.g., common security artifacts).

In some embodiments, a computer system may be implemented for managing security artifacts. The computer system may be part of a security management system. The computer system may be configured to implement methods and operations described herein. The computer system may include one or more processors and a memory accessible to the one or more processors, the memory storing instructions which, upon execution by the one or more processors, cause the one or more processors to perform one or more methods or operations described herein. Yet other embodiments relate to systems and machine-readable tangible storage media, which employ or store instructions for methods and operations described herein.

In at least one embodiment, a method may include receiving a request to manage security of an application. The method may include identifying a plurality of security artifacts related to security for accessing the application. The method may include determining security access for accessing the application. The method may include generating a security artifact archive for the application, the security artifact archive including security data and security artifact data. The security data is based on the security access. The security artifact data identifies one or more of the plurality of security artifacts. The method may include storing the security artifact archive in association with an application identifier that identifies the application and a version identifier corresponding to the application. The method may include, responsive to the request, transmitting the security artifact archive to the application, where the application operates to manage security for accessing the application based on the security artifact data and the security access in the security data of the security artifact archive.

In some embodiments, a first security artifact of the plurality of security artifacts includes an access credential, and a second security artifact of the plurality of security artifacts includes a security access key.

In some embodiments, the security data includes an access policy that indicates the security access and the security data includes attribute data, indicating one or more attributes of the application. The security artifact data may include the plurality of security artifacts, and at least one of the plurality of security artifacts may relate to security for accessing the data object In some embodiments, the security artifact archive is generated for a plurality of objects including the application and a data object. The security data may indicates a type of each of the objects.

In some embodiments, identifying the plurality of security artifacts includes sending a query on security artifacts stored in a security artifact data store, where the query is sent to identify security artifacts for managing access to the application.

In some embodiments, the method further includes determining that the security artifacts enable the security access to one or more applications, the one or more applications being different from the application. The method further includes storing the security artifact archive in association with the version identifier and a distinct application identifier for each of the one or more applications. The method further includes transmitting the security artifact archive to each of the one or more applications, where each of the one or more applications operates to manage security for accessing each of the one or more applications based on the security artifact data and the security access in the security data of the security artifact archive.

In some embodiments, the method may further include detecting a change in the security access for accessing the application; and modifying the security artifact archive based on the detected change; and transmitting the modified security artifact archive to the application. The change may include an additional security artifact for accessing the application. Modifying the security artifact archive may include modifying the security artifact data to identify the additional security artifact. Detecting the change in the security access for accessing the application may include determining a change in a life cycle of a product for the application. The change in the security access is may be detected based on the change in the life cycle of the product.

In some embodiments, the request is for a subscription for security artifacts for the application, and the security artifact archive is provided to the application based on a schedule according to the subscription.

In at least one embodiment, a method may include identifying a first security artifact archive stored in association with a first version identifier for a plurality of applications. The security artifact archive includes security data and security artifact data. The security data identifies security access information about managing security access to the plurality of applications. The security artifact data includes a security artifact shared by the plurality of applications. The method may include detecting a change in the security access to the plurality of applications. The method may include generating a second security artifact archive associated with a second version for the plurality of applications. The second security artifact archive is generated for the detected change based on the first security artifact archive. The method may include storing the second security artifact archive in association with a second version identifier for the plurality of applications. The method may include transmitting the second security artifact archive to a computing system providing access to the plurality of applications.

In some embodiments, the change in the security access to the plurality of applications includes a change in a level of authentication. The change in the security access to the plurality of applications may include a change in a security artifact identified by the security artifact data for the first security artifact archive. The change in the security access to the plurality of applications may include a change in an access policy indicated by the security data, and wherein the second security artifact archive is generated to include the change in the access policy. Detecting the change in the security access to the plurality of applications may include determining a change in a life cycle of a product for the plurality of applications. The change in the security access to the plurality of may be detected based on the change in the life cycle of the product.

In some embodiments, the method may include identifying a data object that shares security artifacts with the plurality of applications. The method may include storing the second security artifact archive in association with a second version identifier for the data object. The method may include sending a message to the computing system to indicate that security access to the data object is to be controlled using the second security artifact archive.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIGS. 3-5 depict data structures for managing security artifacts according to some embodiments.

DETAILED DESCRIPTION

Figure 1:
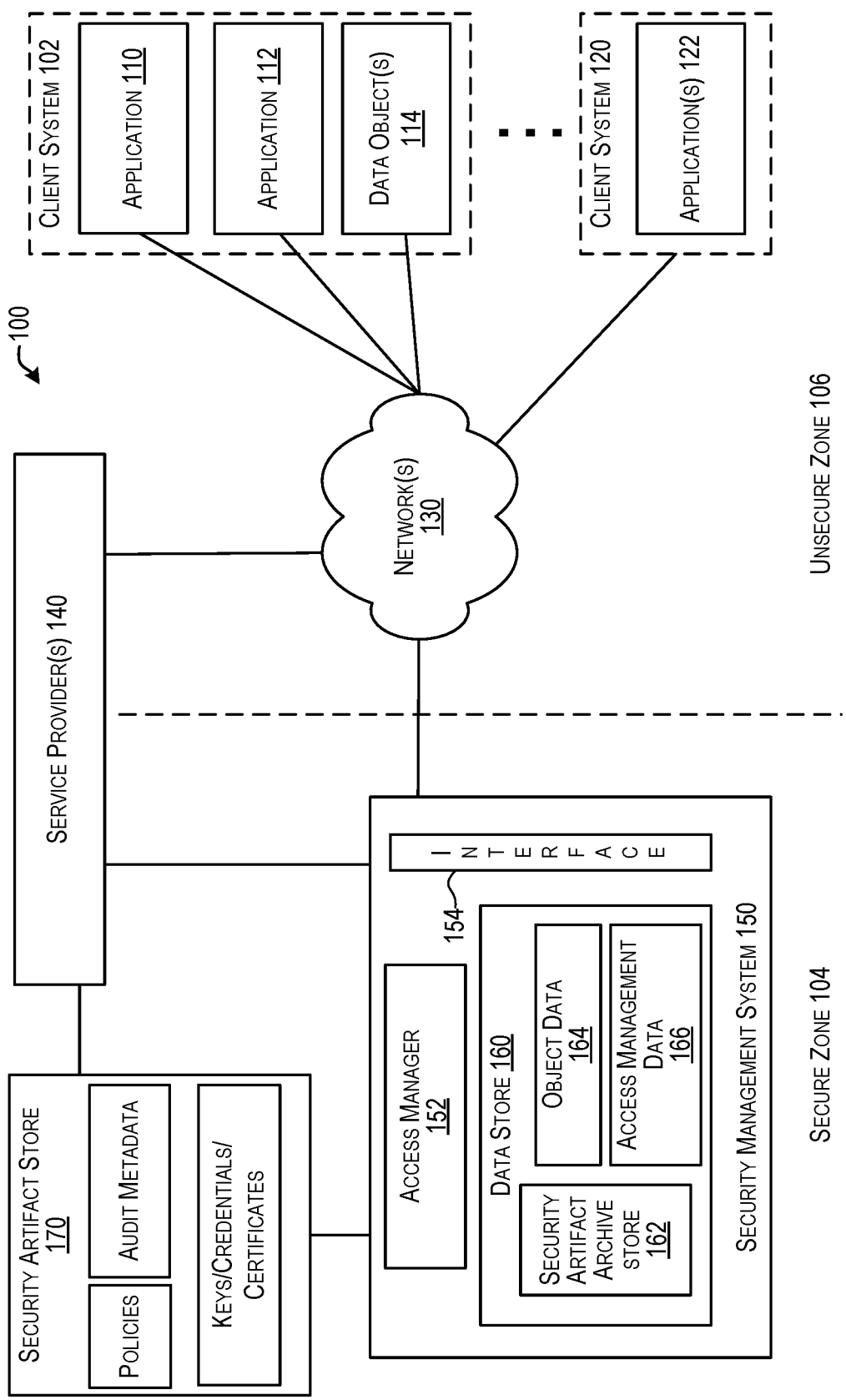
FIG. 1 illustrates a high-level diagram of system that provides security artifact management, in accordance with an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, techniques are provided (e.g., a method, a system, non-transitory computer-readable medium storing code or instructions executable by one or more processors) to manage security artifacts. Specifically, a security management system is disclosed for implementing security artifact archives to manage security artifacts. A security artifact archive may include information for managing one or more security artifacts that can be referenced or included in the security artifact archive. Because a security artifact archive can manage multiple security artifacts, a security artifact archive can been viewed as a "security artifact bundle". The security management system can create, edit, read, send, and perform other management operations for security artifact archives.

A security artifact can include data related to securing access to an object in an enterprise computing environment. Examples of security artifacts can include, without restriction, an access policy (e.g., an authentication policy or an authorization policy), an audit policy, credential information (e.g., passwords, usernames, or other sensitive data), a key, a certificate, a token, application data, or any other data related to security or access for an object. Objects may correspond to an identifiable entity in an enterprise system for which security can be managed. Examples of objects may include, without limitation, a process, a service, an application, data, a hardware resource, or a computing resource.

The security management system may manage security for accessing objects. As such, a security artifact archive can be stored in association with the objects that are protected. In some embodiments, a security artifact archive may be modified to protect access to several related objects or objects that share security artifacts. A security artifact archive can be created for a specific object or types of objects (e.g., application-specific). A security artifact archive may store information about the scope of access and may be defined such that it includes a name, a version, a tag, or other information about the objects that are protected. Security artifact archives may be managed with respect to life cycle management (LCM) for objects as a part of a product or service. LCM may be applied to security artifact archives to create, version, delete, and otherwise manage security artifact archives for products or services.

In some embodiments, a recipient (e.g., clients and service providers) can request the security management system to provide security artifacts periodically. Requests can indicate criteria for which security artifacts are requested. The security artifacts may be identified based on the criteria and then bundled into one or more security artifact archives. Security artifacts may be requested according to a schedule. The schedule may be specified by the recipient. Security artifact archives may be sent according to the schedule as well as updates to those security artifact archives. In some embodiments, the security management system can provide a subscription service, such that security artifact archives are provided based on the subscription. Security artifact archives may be pushed to recipients or pulled by the recipients. Recipients can aggregate security artifact archives to be managed locally for access to objects.

By decoupling management of security artifacts to a central management system, e.g., a security management system, service providers and client systems can reduce, if not eliminate, the burden of managing security artifacts in a fine-grain manner. In an enterprise environment having thousands of users coupled with thousands of objects, managing security for individual objects becomes a challenge. Specifically, as an enterprise changes its security policies and LCM changes for objects, the enterprise is burdened with having to adjust security access for individual changes to objects during a life cycle of a product or a service.

A security management system can aggregate access management data along with existing security artifacts to produce security artifact archives. The security artifact archives can be customized and configured in many ways, for example, specific to a group of users (e.g., a role), types of objects (e.g., applications), policies, levels of security, LCM, or a combination thereof. Security artifact archives may be associated based on a relationship, such as versioning or sharing common security features (e.g., common security artifacts).

I. High-Level Overview of Security Management System

FIG. 1 illustrates an example of a system 100 that provides security artifact management, in accordance with some embodiments. One or more of the below-described techniques may be implemented in or involve one or more computer systems. The computing environment in FIG. 1 is not intended to suggest any limitation as to scope of use or functionality of described embodiments.

System 100 may include one or more client systems 102, 120 (referred to herein as "client system" or "client") and security management system 150. Security management system 150 may be implemented by a computer system. Client systems may be operated by one or more users. Security management system 150 may be located in a secure operating environment 104 ("secure zone"), which is protected my one or more security measures (e.g., a firewall). Client systems 102, 120 may be located in an unsecure operating environment 106 ("unsecure zone") external to secure zone 104.

System 100 may include a service provider system 140 ("service provider"), which is implemented by a computer system. Service provider system 140 may provide client systems with access to objects, such as applications, services, or data. Access to objects may be provided via network 130. All or part of service provider 140 can be located in an enterprise environment as part of secure zone 104. With service provider 140 being a third party system, service provider 140 may often be located in unsecure zone 106 external to an enterprise computing environment. In the example shown in FIG. 1, client systems 102, 120 may access objects, such as applications and data objects. All or some of the objects may be accessed via network 130 from service provider 140. Client system 102 may access application 110, application 112, and data objects 114. Client system 120 may access one or more applications 122.

Client systems 102, 120, security management system 150, and service provider 140 may be communicatively connected via one or more communication networks 130. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols. In general, communication network 130 may include any communication network or infrastructure that facilitates communications between client systems and security management system 150.

In some embodiments, system 100 may include a communication system implemented by security management system 150, service provider 140, client system(s), or a combination thereof. The communication system may implement a push notification service (e.g., Apple push notification service provided by the Apple® corporation or Google notification service provided by the Google® corporation). The push notification service may facilitate communication with remote devices (e.g., endpoint devices or clients) through network 130. The push notification service may deliver a configured application to a client. Security artifacts and/or security artifact archives may be communicated in system 100 via communication system using pull and/or push mechanisms, e.g., a push or pull notification service, for communication. Push and/or pull mechanisms may be configured on a subscription basis for services provided by security management system 150.

Security management system 150 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, security management system 150 may correspond to a computer system for performing processing as described herein according to an embodiment of the present disclosure. The computing system that makes up security management system 150 may run any number of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, security management system 150 may be included in or implemented as a service such as Oracle Platform Security Service (OPSS), provided as an identity management solution by Oracle® Corporation. In various embodiments, security management system 150 may be configured to run one or more services or software applications described in the foregoing disclosure. For example, security management system 150 may provide management of security artifacts according to a subscription.

In some embodiments, security management system 150 may be implemented as an enterprise computing system or a cloud computing system comprising one or more computers and/or servers that may include those described above. Security management system 150 may include several subsystems and/or modules, including some, which may not be shown. For example, security management system 150 may include interface 154 and access manager 152. Access manager 152 may perform access management functions. Access manager 152 may be implemented as a product or service of Oracle Access Manager provided by Oracle® Corporation. Security management system 150 may have more or fewer subsystems and/or modules than shown in the figure, may combine two or more subsystems and/or modules, or may have a different configuration or arrangement of subsystems and/or modules. Subsystems and modules of security management system 150 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, security management system 150 may also provide other services or software applications can include non-virtual and virtual environments. In some embodiments, these services may be offered as web-based or cloud services or under Software as a Service (SaaS) model to the users of client systems 102, 120. For example, security management system 150 may manage security artifacts according to a subscription. The services offered by security management system 150 may include application services. Application services may be provided by security management system 150 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in security management system 150, which may be implemented as a cloud infrastructure system. Users can acquire the application services without the need for customers to purchase separate licenses and support. Various different SaaS services may be provided. Users operating client systems 102, 120 may in turn utilize one or more applications to interact with security management system 150 to utilize the services provided by subsystems and/or modules of security management system 150.

Security management system 150 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in security management system 150 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Security management system 150 may also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, security management system 150 may be coupled to or may include one or more data stores, such as data store 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 160 may be accessible via a network in secure zone 104. Data store 160 may include or provide security artifact archive store 162, an object data store 164, and/or an access management data store 166. Although depicted as different data stores, more or fewer data stores may be implemented to store data according to the techniques disclosed herein.

Security management system 150 may communicate with service provider 140 and/or multiple instances of client systems 102, 120 via interface 154. Interface 154 may be defined by one or more communication protocols or languages. In some embodiments, interface 154 may be defined by a programming interface (e.g., an application programming interface (API)). The programming interface may include callable functions to manage security artifacts. For example, interface 154 may provide a representational state transfer (REST)-based interface enabling access as a web-based service.

In some embodiments, interface 154 may generate and provide a graphical interface to either or both of service provider 140 and client systems 102, 120. For example, interface 154 can provide an administrator graphical interface to enable a user (e.g., an administrator) to manage security artifact archives. Service provider 140 and/or client systems can manage (e.g., create, delete, edit, modify, update, or read) security artifact archives through an interface provided by interface 154. For example, through interface 154, security management system 150 can receive requests for managing security artifacts. Security management system 150 can provide security artifact archives or information from security artifact archives to enable service provider 140 and client systems to determine access for objects.

System 100 may also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include a security artifact store 170. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. Security artifact store 170 may be accessible via a network. In some embodiments, either or both of service provider 140 or security management system 150 may contribute and maintain security artifacts in security artifact store 170. Security artifact store 170 may store data about policies, audit metadata, keys, credentials, certificates, and any other data for securing access to an object. Security artifact store 170 may store object-specific data, for example, security data. In some embodiments, security artifacts may be received by security management system 150 from service provider 140 and/or any of client systems 102, 120.

In an enterprise computing environment, client systems 102, 120 or service provider 140 may utilize a subset of the security artifacts accessible via a service provider 140. For example, a client system 102 may implement access management for application 110 based on one or more security artifacts. Client system 102 may use policies to determine who may access application 110, what actions they are authorized to perform, and how the actions can be performed. Client system 102 may rely on an audit policy that indicates which activities are monitored. Further, the application 110 may use additional security artifacts to interact with other systems, such as credentials to access other systems, certificates to initiate secure connections with other systems, and encryption keys to encrypt/decrypt data in secure data stores. In an enterprise environment, security is less of a concern with respect to security artifacts. However, increasingly, objects may be accessed in an unsecured environment, e.g., unsecure zone 106, such that security for access to objects should be controlled in a secure environment such as secure zone 104.

In some embodiments, where a client system operates in an unsecure zone 106, the client system may not have access to security artifacts. Providing the security artifacts to an unsecure zone may compromise the security of access to objects. Instead, a client system can request a subset of security artifacts through security management system 150 that may also perform lifecycle management (LCM) operations on the security artifacts. For example, when application is no longer utilized, the corresponding subset of security artifacts can be removed. Security management system 150 may determine access to objects based on security data, such as policies and roles. Access management data 166 may store access management information for accessing objects, including policies (e.g., audit policies, authorization policies, authentication policies, and access policies) and roles. Similarly, when a new application is deployed a new subset of security artifacts can be created.

Security management system 150 may create and manage security artifact archives for enabling an object, e.g., an application, to access one or more security artifacts. As further described in detail with reference to FIGS. 2-5, a security artifact archive can have data such as a name and a version corresponding to an object. The security artifact archive can include or maintain a reference to one or more security artifacts to access the object. Each security artifact archive can have identification information (e.g., a name)

and a version corresponding to an object or group of objects. A security artifact archive can be managed based on versions corresponding to changes with the objects or changes to the security artifact (e.g., new credential, modified credential, new certificate, etc.) for those objects.

Security management system 150 may maintain an object data store 164 for information about one or more objects that are managed by a security artifact archive. The information in object data store 164 may include one or more attributes about an object. Object data 164 for each object may be mapped or associated with each security artifact archive applicable to the object. Security management system 150 may retrieve and access security artifact archives for an object based on a mapping in object data 164 to security artifact archive store 162.

Security management system 150 may operate according to the processes described with reference to FIGS. 2 and 6-8. In some embodiments, security management system 150 may operate automatically and/or based on requests from service provider 140 or a client system. Security management system 150 may identify objects to be managed for security. Security artifact store 170 may be accessed to identify security artifacts for the objects. Access management data 166 or access manager 152 may be consulted to identify access management data for controlling access to the security artifacts. In some embodiments, security management system 150 may determine authorization to access the security artifacts.

Security management system 150 may generate a security artifact archive based on the access management data (e.g., the permitted security access) and security artifacts that have been discovered. The security artifact archive may be generated to include information about the object. In some embodiments, the security artifact archive may be stored in association with information about the object. All or part of the security artifact archive may be transmitted to the client system or service provider 140 to manage access to the object based on the discovered security artifacts identified in the security artifact archive.

In some embodiments, a client system can send a request to security management system 150 for a security artifact archive. The request can include a specific version identifier or a version identifier that indicates the "latest" version. In the absence of a version identifier, a default version can be provided (e.g., the latest version). Security management system 150 can request access manager 152 to determine whether an application on the requesting client system is authorized to access the security artifact archives. For example, application 110 may not be authorized to access a security artifact archive for application 112). If authorized, the security artifact archive can be generated, or if already existing, retrieved from security artifact archive store 162. By storing the security artifact archives locally by security management system 150, performance for accessing security artifacts can be improved, such that less processing is required. The implementation of a security artifact archive further protects the security artifacts from direct access and ensures that the security artifacts are compliant with access management policies. In some embodiments, security management system 150, acting as a central repository for security artifacts, may store security artifacts in security artifact store 170 as a master security artifact repository aggregated in an enterprise environment.

II. Detailed View of Security Management System

Figure 2:
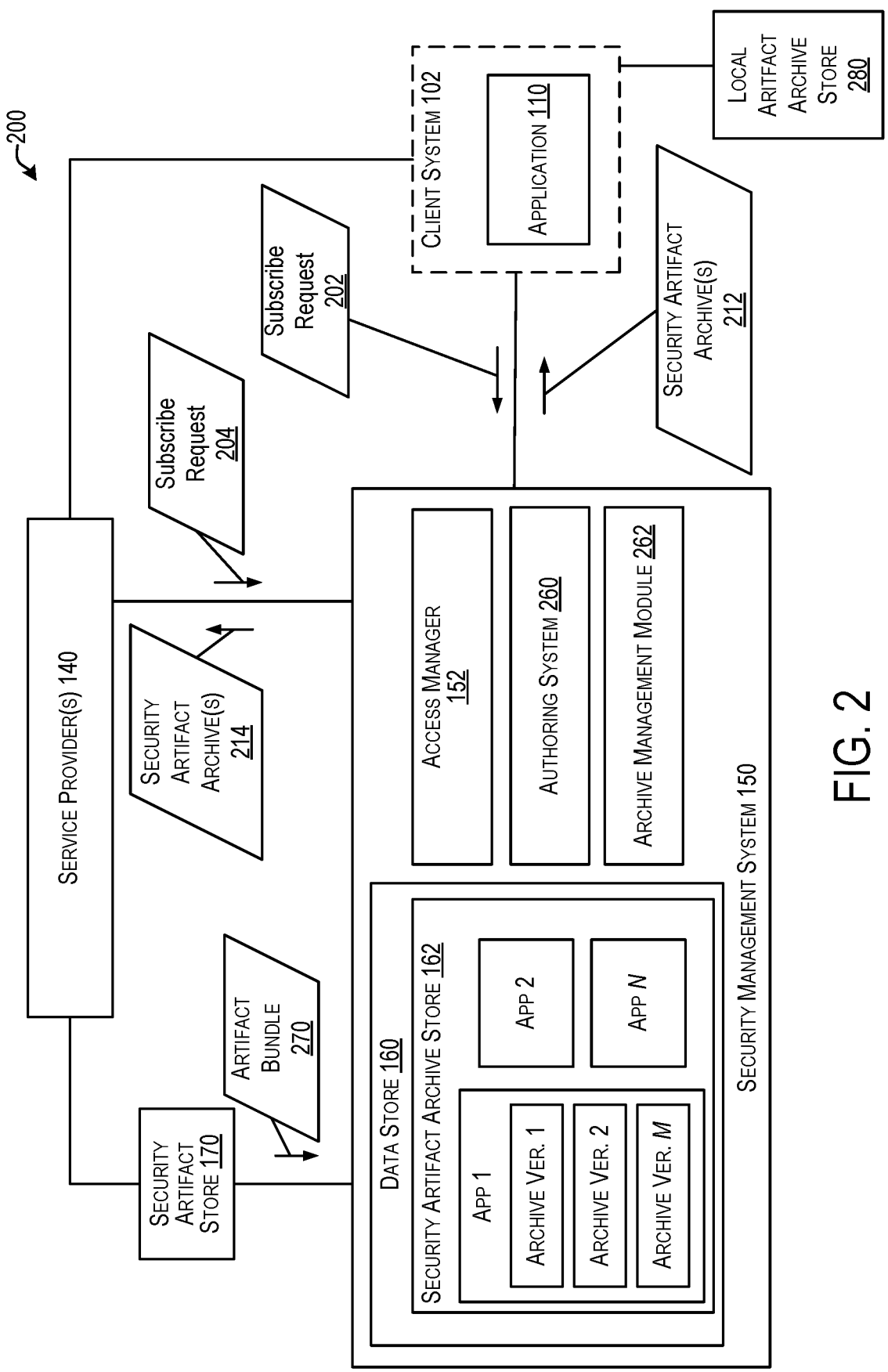
FIG. 2 illustrates a detailed diagram of a system that provides security artifact management, in accordance with an embodiment of the present invention.

Now turning to FIG. 2 is a detail diagram 200 of security management system 150 according to some embodiments. Security management system 150 may include several subsystems and/or modules, such as authoring system 260 and archive management module 262 to perform techniques for managing security artifacts.

In the example shown in FIG. 2, security management system 150 can operate based on communication from either or both of service provider 140 or a client system 102. For example, security management system 150 can receive a request 204 from security provider 140 and/or receive a request 202 from client system 102. Either of requests 202, 204 may be received based on the entity that manages access to an object to be accessed. Different types of requests may be received. One type of request may provide information about a security artifact archive to create. Another type of request may include information for which to identify existing security artifacts. Yet another type of request may be for access to a particular object. In some embodiments, a request may originate from a user (e.g., an administrator) via interface 154 to manage security artifact archives. Examples of requests are further described with reference to FIGS. 6-8.

In some embodiments, requests 202, 204 may be for a subscription of a service provided by security management system 150. A subscription may be specific to a particular object or a group of objects based on criteria. Subscription may be based on access determined by access manager 152 for an enterprise environment. For example, subscription may be based on a policy for access. The access policy may be role-based access for the enterprise environment. Requests 202, 204 may indicate a criteria for subscription, based on which security management system can determine a subscription for an object.

Responsive to receiving a request, access manager 152 can determine whether the requestor is authorized to make the request. Access manager 152 may utilize access management data 166 to determine authorization for the request. The access management data 166 may be identified for archive management module 262 to create or manage security artifact archives.

Authoring system 260 may enable a user (e.g., an administrator) to provide criteria for management of security artifacts. Criteria may be received through interface 154. Criteria may include information to define a scope of a security artifact archive. The criteria may be specified with respect to any of the fields defined for security data in a security artifact archive. Criteria may include information used to identify security artifacts to manage for one or more objects. Authoring system may handle receipt of the criteria to provide to archive management module 262.

In some embodiments, authoring system 260 may generate a graphical interface that can be provided to service providers and client systems via interface 154. The graphical interface may be an authoring tool to create, manage, and modify security artifacts, in particular the search and configuration of security artifacts archives. The graphical interface can receive input, such as any information received via requests 202, 204. Authoring system 260 can provide archive management module 262 with the input to generate, configure, and manage security artifact archives. Subscription requests can be received through a graphical interface, by which a user can indicate objects to be managed.

Figure 6:
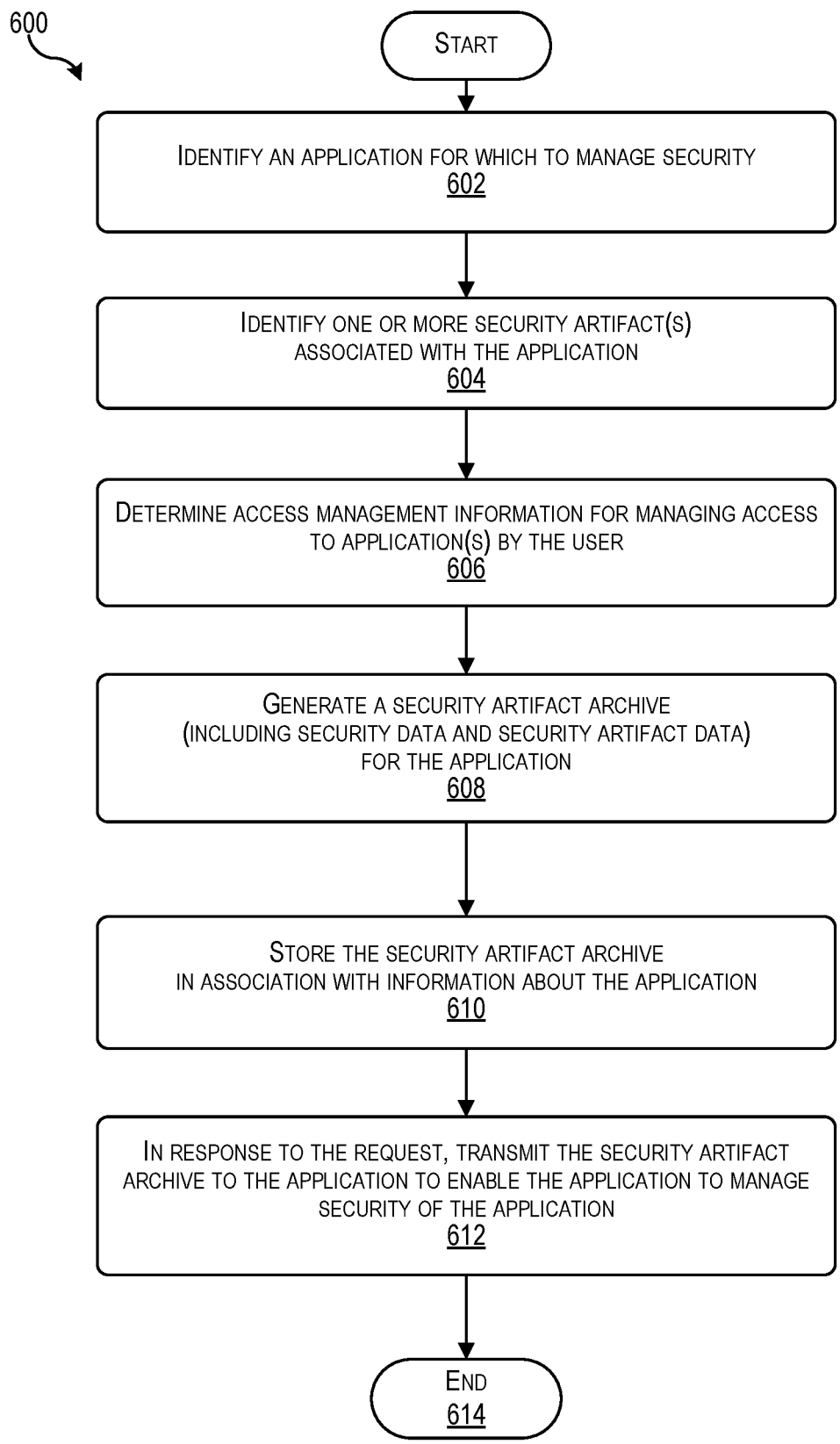
FIGS. 6-8 show processes for managing security artifacts for one or more applications according to some embodiments.
Figure 7:
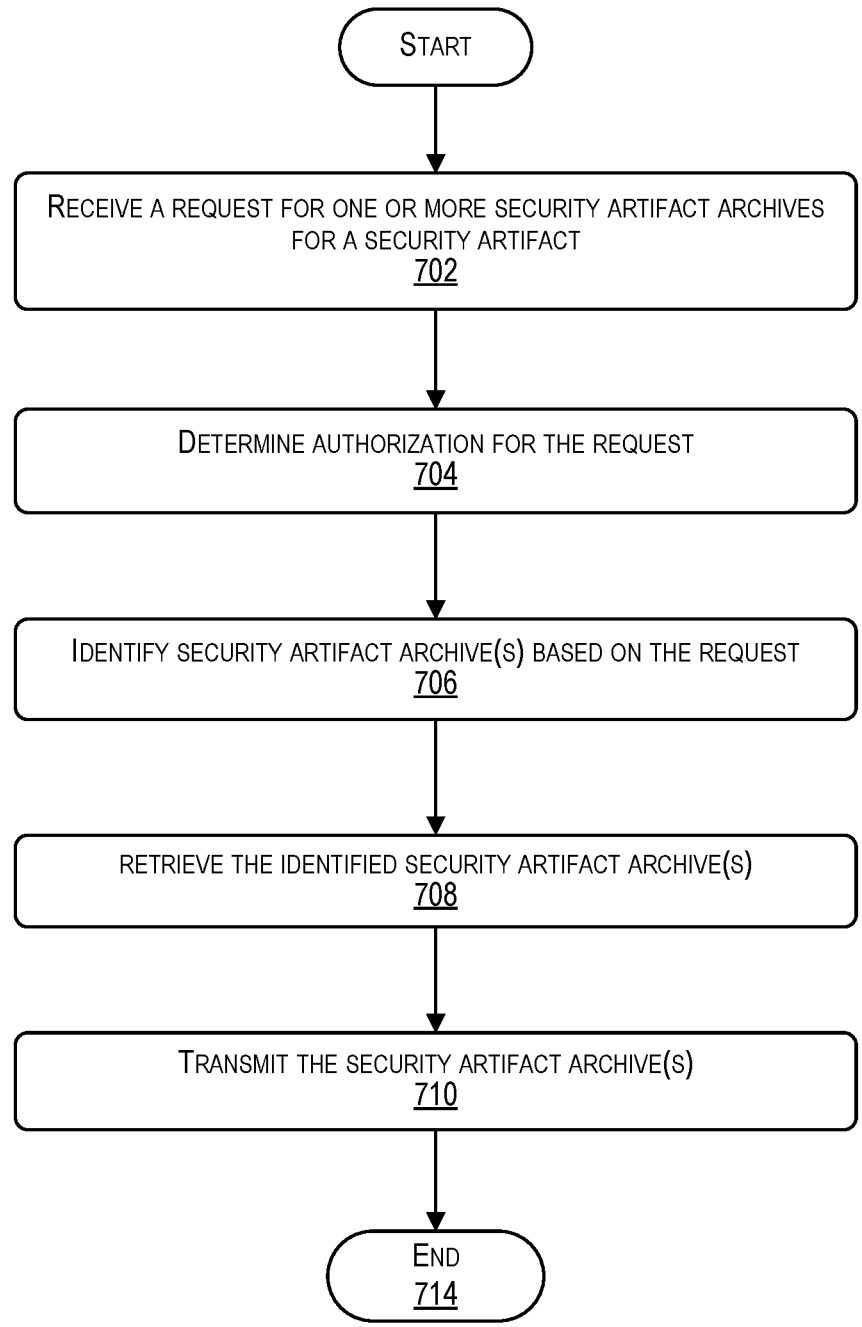
Figure 8:
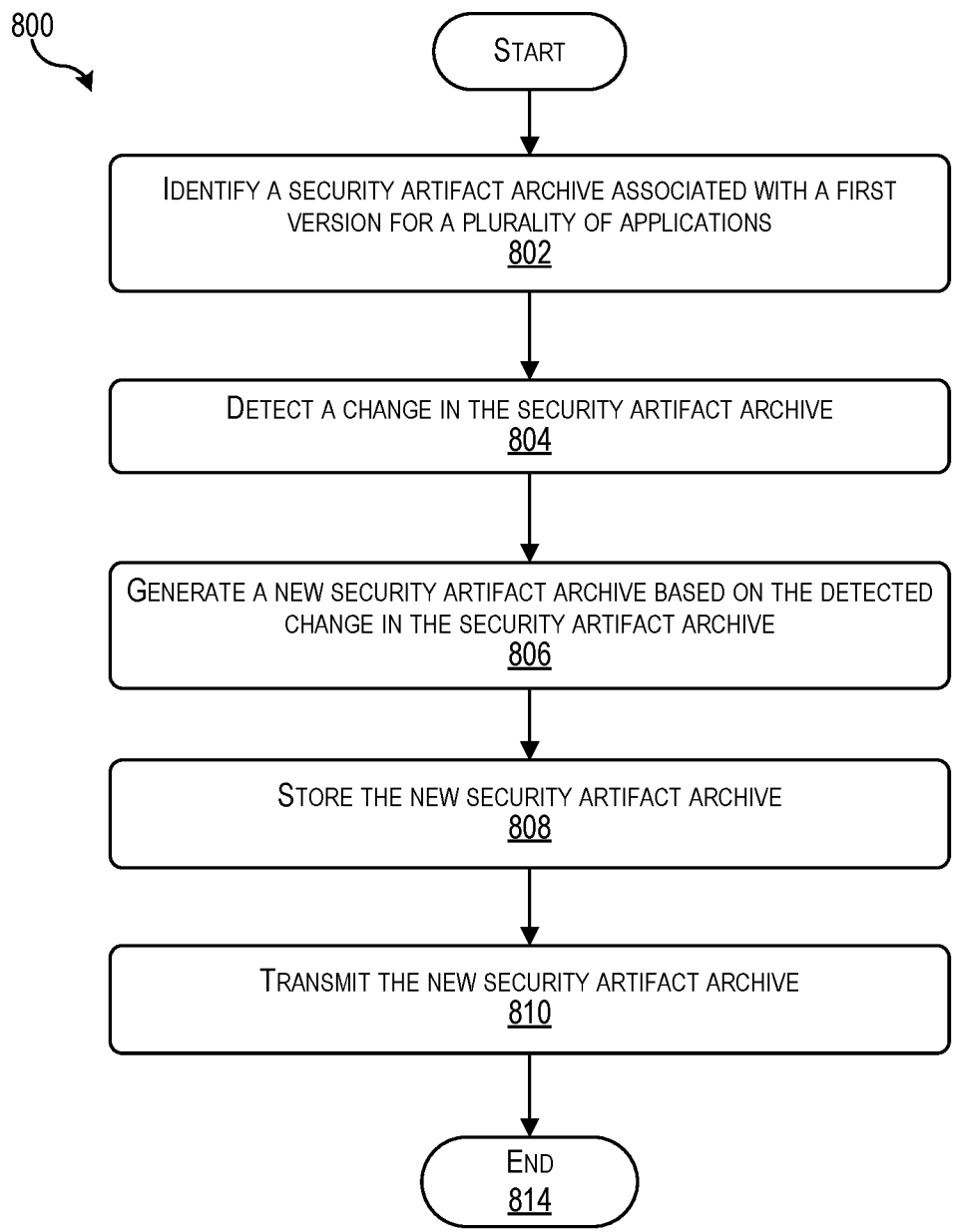

Security management system 150 may handle management of security artifacts according to the processes with reference to FIGS. 6-8. Specifically, security management system 150 can gather multiple security artifacts for an object by querying security artifact store 170. Security artifacts may be bundled 270 from security artifact store 170 into a security artifact archive that can be distributed to one or more recipients, e.g., a service provider 140 or client system. Security artifact archives may be created and managed to determine security access an object. Security access for an object may be determined based on security artifacts in security artifact archives identified for accessing the object.

Archive management module 262 may operate in response to a request or may operate in automated manner. Archive management module 262 can obtain, from security artifact store 170, security artifacts applicable to an object or a group of objects. Archive management module 262 can perform a query of security artifacts. The query may be based on information (e.g., criteria) in a request to create a security artifact archive or to access a security artifact archive.

Access management data may be obtained from access manager 152. The access management data may define access to an object and how a security artifact is to be used to access the object. In some embodiments, a request (e.g., request 202 or request 204) may include information to include in a security artifact archive. The information may include criteria for defining a security artifact archive, and/or customized information (e.g., a tag, description, version, attributes, etc.) to define the security artifact archive.

Archive management module 262 may generate a security artifact archive using the structure and techniques described with reference to FIGS. 3-5. A security artifact archive may include information that associates the security artifact archive with the object for which access is controlled by the security artifact archive. The security artifact archive may be defined such that it includes data that indicates the type of objects or other attributes to be associated with the security artifact archive.

In some embodiments, archive management module 262 may manage different versions of a security artifact archive. Different versions may be managed based on a change in access or any of the information in a security artifact archive. For example, the versions may correspond to different versions of security access for an object based on attributes associated with the object in the security artifact archive. In another example, the versions may correspond to different versions of security artifacts that have changed based a change in security access to an object. In yet another example, the versions may correspond to changes in security access based on a change in an object with respect to life cycle management. Different versions of a security artifact archive may be stored in security artifact archive in association with version information. The different versions of a security artifact archive may be stored in association with the information that differs (e.g., different versions of an object or different versions of security artifacts). Example of different versions of security artifact archives is described with reference to FIGS. 4 and 5.

In the example shown in FIG. 2, archive management module 262 generates multiple versions of a security artifact archive for an object, such as an application ("App"). For App 1, different versions of a security artifact archive may be generated up to m different versions. Different versions of a security artifact archive may be generated for different apps, up to n different Apps. A different version of a security artifact archive may be generated for a variety of reasons. Different versions may be generated for changes in security access, changes in a life cycle of the application, a change in user data, a change in policies for accessing the application, or other reasons that impact security of the application. Different versions of a security artifact archive may be stored with information identifying the different versions for the object. In some embodiments, a security artifact archive may be generated such that it includes version information and is mapped to data about the object in a different data store. Other examples of storing and managing security artifact archives are described below.

In response to receiving either of request 202, or request 204, archive management module 262 may generate a response to send to the source of the request. For example, response 212 may be generated and sent to client system 102 in response to request 202. A response 214 may be generated and sent to service provider 140 in response to request 204.

A response may include information that is requested. For example, when a request is for security artifacts for an object identified by the request, a response may include a security artifact archive for the object. The security artifact archive may be generated if non-existent, otherwise located and retrieved. In some embodiments, when a request is for managing security artifact archives, the requested operation may be determined and performed. A response may indicate confirmation as to whether the request was performed. A response may include information from a security artifact archive that was managed based on an operation that is requested. In response to receiving a security artifact archive, a requestor can manage access to an object based on the information in a security artifact archive.

In some embodiments, archive management module 262 may automatically, and periodically perform operations to manage security artifact archives. Archive management module 262 may perform operations to determine changes in security artifact archives. For example, queries may be executed to identify changes in existing security artifacts and to identify new security artifacts. A security artifact archive may be updated based on detecting new artifacts or changes to existing security artifacts. Archive management module 262 may perform operations to determine whether to modify any security artifact archives based on detecting changes. Changes may include identifying new objects to be managed and the security artifacts associated with those objects. Changes may include modifications to access management data.

In some embodiments, a security artifact archive may be provided to client system 102 via a push or pull communication. Client systems, such as client system 102 may receive updates or changes to security artifacts in different versions of a security artifact archive. Security management system 150 can push out a security artifact archive to client systems, based on changes and updates to security artifacts, or new security artifact archives that are generated.

Client systems, such as client system 102, may include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, client system 102 may be coupled to data store 280, which serves as a local artifact archive store for security artifact archives received from security management system. Client system 102 may maintain local artifact archive store 280 with security artifact archives and their associated versions obtained from security management system. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. Data store 280 may be accessible via a network.

By maintaining security artifact archives in a local data store, client systems and service providers can effectively and efficiently manage different versions of security artifacts. Security artifact archives further enable client systems and service providers to manage different versions of security artifacts in an enterprise environment having thousands of objects. Security artifact archives enable client systems and service providers to manage security for objects according to compliance and current access policies managed by a central system, such as security management system. The techniques disclosed herein enable client systems and service providers to receive security artifacts as they change and are created, so those system are the current security access required for objects.

III. Examples of Security Artifact Archives

Figure 4:
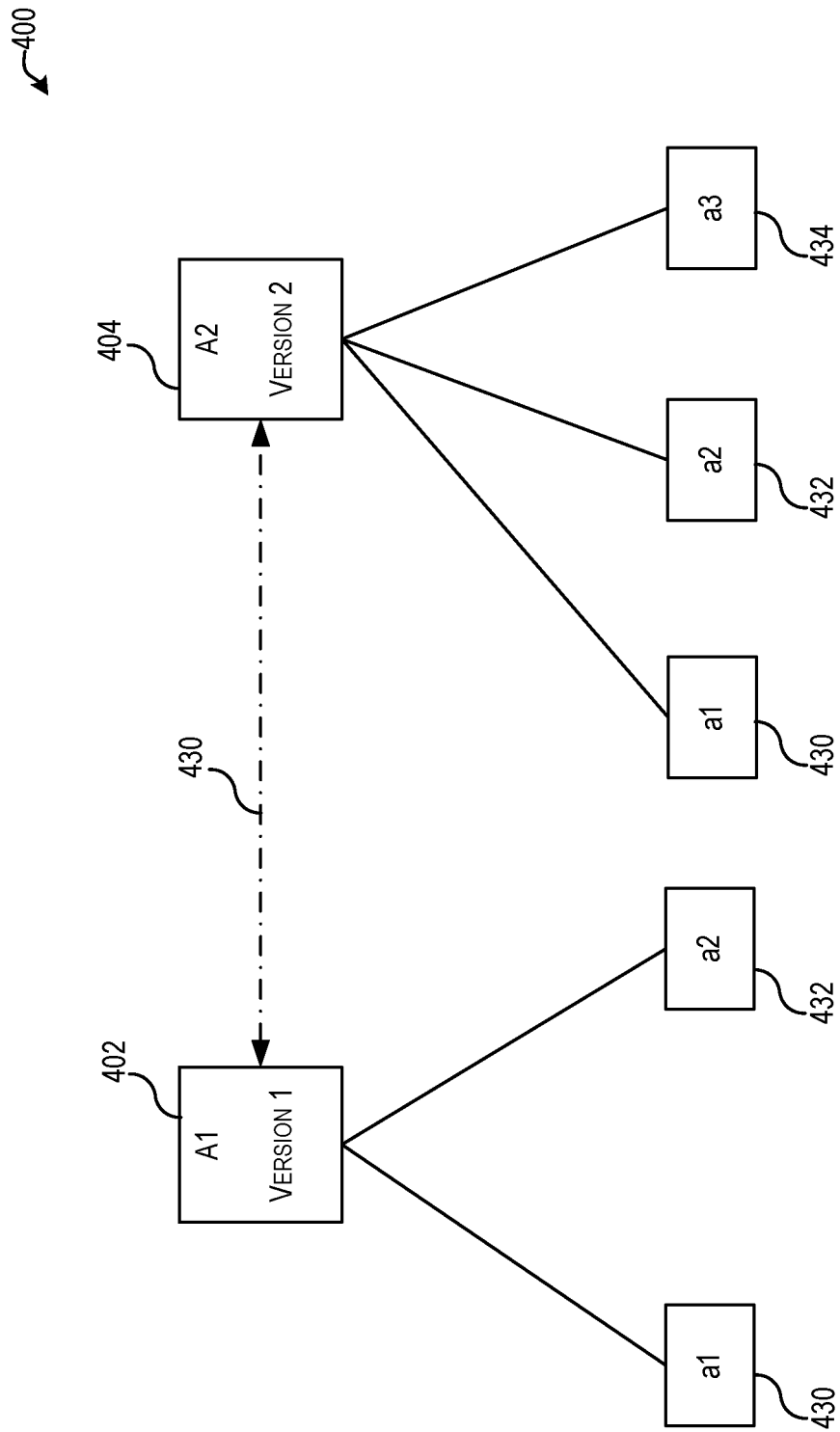
Figure 5:
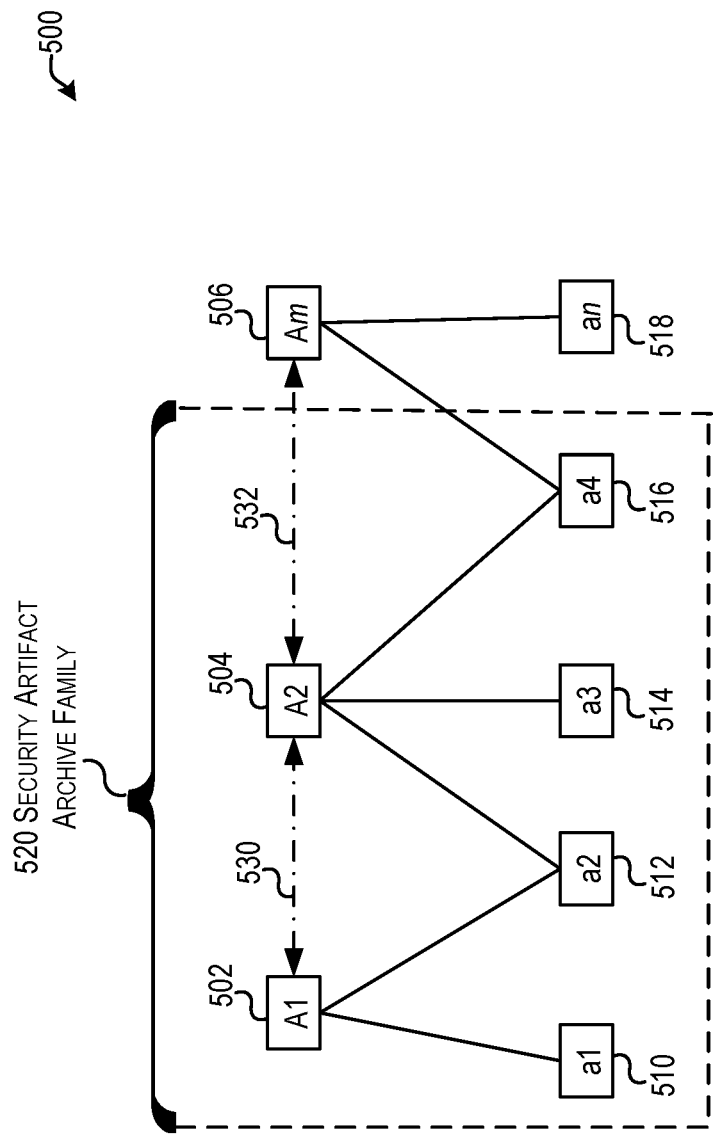

FIGS. 3-5 depict data structures for managing security artifacts according to some embodiments. Security management system 150 may generate one or more security artifact archives, such as any of the security artifact archives described with references to FIGS. 3-5. The data structures shown in FIGS. 3-5 can be used to manage security artifact archives. The data structures illustrated in FIGS. 3-5 can be implemented to store data in any one of the data stores shown in data store 160 of FIG. 1. The data structures shown in FIGS. 3-5 can be managed in storage (e.g., data store 160) accessible to security management system 150.

Each of the illustrated data structures may be organized in a variety of ways depending on how, what, and/or where data is stored. Although each of the data structures are shown including particular data, more or fewer data structures may be implemented to store the data. A data structure can include a reference to other data structures. An instance of each of the data structures may be created for managing storage of different security artifacts. The data structures may be implemented using one or more types of data structures including, without restriction, a linked list, an array, a hashtable, a map, a record, a graph, or other type of data structure. Data structures described with reference to FIGS. 3-5 can be implemented by security management system 150. Each of the data structures may be defined in a declarative manner based on input to security management system 150. The data structures may be defined based on a template, e.g., a template defined based on a markup language, such as Extended Markup Language (XML).

Implementing storing data as a security artifact archive supports the central management of security artifacts. By centrally managing security artifacts, a burden of managing and identifying a relationship of the security artifacts is minimized if not eliminated for managing access to objects. For example, when applications are provided by a service provider, the service provider may not need to be familiar with access policies for the applications and therefore, do not need to manage security artifacts for the applications. A security management system can detect changes in access policies and can provide updates or changes in security artifacts throughout the life of an application.

a. Structure of a Security Artifact Archive

Now turning to FIG. 3, is an example of a data structure implemented for storing data as a security artifact archive 300 according some to some embodiments. Security artifact archive 300 may include security data 310 and security artifact data 320. Each of security data 310 and security artifact data 320 may be metadata that identifies data or a location in storage (e.g., a reference to storage) of data. Security data 310 may indicate or identify data for managing access to one or more objects using security artifacts. Security artifact data 320 may include or indicate one or more security artifacts for securing access to those objects. As described further below, a security artifact archive 300 may be generated for managing access to objects, for which security artifacts are managed in several different security artifact archives referenced from security artifact archive 300.

All or some of the data in security artifact archive 300 may be obtained from an access manager and security artifacts may be obtained from a security artifact store. In some embodiments, all or some of security data 310 may be obtained from a system that provides an object, such as a service provider 140.

Security management system 150 may provide an authoring system for creating a security artifact archive. As described above, security management system 150 may provide a graphical interface to receive input from a user to define all or part of a security artifact archive. The authoring system may enable a user to search and select security artifacts for a security artifact archive. A graphical interface may be provided to receive input to define the security data 310 or to identify a source of the security data 310.

Security data 310 can include data for managing security of an object using one or more security artifacts. Security data 310 may include one or more types of data, such as access management data 312, object data 314, version data 316, attribute data 318, history data 320, archive reference 322, or a combination thereof.

Access management data 312 may include or identify one or more policies for accessing an object. Examples of policies may include, without restriction, an access policy, an authorization policy, an authentication policy, a policy for managing one or more artifacts, or a combination thereof. Access management data 312 may include role information indicating one or more roles and their associated functions permitted for managing security artifacts identified by security artifact archive 300. Access management data 312 may include audit policies or information for auditing security of an object. Access management data 312 may indicate or may be used to determine what security artifacts to manage, how to manage those security artifacts, and when to manage those security artifacts.

Access management data 312 may be obtained from an access management system, e.g., access manager 152. Access management data 312 may be updated according to a schedule so that security artifact archive stores most current policy information for managing access based on security artifacts.

The example in FIG. 3 shows policy data 312 including information for an access policy (e.g., "access policy 1") for controlling access to objects (e.g., object 1 and object 2). A policy may indicate information such as a type of security for managing access to those objects. The security artifacts identified based on security artifact data 320 may include security artifacts corresponding to the type of security indicated by the policy.

Security data 310 may include object data 314. Object data 314 may indicate information about one or more objects who access is controlled by security artifact archive 300. Object data 314 may include a reference (e.g., a location in storage) to an object managed by security artifact archive. For example, object data 314 may include a reference to data (e.g., application data) about the object. Object data 314 may include identification information (e.g., an identifier) of an object. The identification information may include version information indicating a version of the object that is managed. In the example of FIG. 3, object data 314 may indicates application information about the application, which is an object whose access is managed by security artifact archive 300.

Security data 310 may include version data 316. Version data 316 may indicate version information about security artifact archive 300. As described further below, multiple security artifact archives may be created, each as a different version. Versions of security artifact archives may be created for example, without limitation, changes in security access for an object, changes in security artifacts, or changes in management of objects. Version information may indicate a version number of security artifact archive 300. As described below with reference to FIGS. 4 and 5, in some embodiments, version data 316 may indicate multiple versions and may include a reference to security artifact archive corresponding to each of the different versions. In the example of FIG. 3, version data 316 indicates security artifact archive 300 as a first version ("version 1").

Security data 310 may include attribute data 318. Attribute data 318 may include information about one or more attributes of security artifact archive or the objects managed by security artifact archive 300. Security management system 140 may locate and manage security artifact archives based on one or more attributes indicated by attribute data 318. For example, security management system 150 can search security artifact archive store 162 for security artifact archives that match criteria for attribute data 318 indicated in a query.

Attribute data 318 may indicate an artifact type. Security artifact archive 300 may manage security artifacts that have the security artifact type. As such, the security artifacts identified by security artifact archive 300 may be of the security artifact type.

Attribute data 318 may include tag information indicating one or more tags assigned to security artifact archive 300. Tag information may be obtained from an user. The attribute data 318 be searchable, being used to identify security artifact archive 300 among other security artifact archives sharing one or more related or similar attributes. For example, attribute data 318 may include a tag for a product that includes several applications. Attribute data 318 may indicate attribute information about an object (e.g., an object identified by object data 314) such as a package, an environment, a lifecycle of a product in which the object is implemented. Access to a product may change for each stage of the lifecycle. Therefore, the stage may be used to determine a level of security for managing access to the objects. Security artifact archives created for applications provided by the same product may include the tag for the product. In FIG. 3, attribute data 318 is shown having, for example, a tag (e.g., "mobile application 1") identifying the application(s) for security artifact archive 300 controls.

History data 320 may include information about the history of security artifact archive. The information may indicate any changes, updates, or additions to security artifact archive 300. The history may be tied to different versions of security artifact archive 300.

Archive reference data 322 may include one or more references or a pointer to (e.g., a location in storage) one or more security artifact archives. As will be described further below, one security artifact archive can reference other security artifact archives to manage a group of security artifact archives. In some embodiments, a group of security artifact archives may be linked or associated with each other on the basis of different versions. As such, archive reference data 322 may indicate an association or mapping of security artifact archive 300 with other security artifact archives.

Security artifact data 330 may include one or more types of data used to secure access to one or more objects. The objects may be of different types. Security artifact data 320 may include one or more security artifacts, references to one or more security artifacts, or a combination thereof. Security artifact archive 300 may be generated for the security artifacts that relate to access for objects to be controlled. As described above, security artifacts may be identified or obtained in a variety of manners.

In the example shown in FIG. 3, security artifact data 330 includes multiple security artifacts for each of object 1 and object 2. Security artifact 332 (e.g., "Security Artifact 1") is security credentials for accessing objects 1 and 2. Security artifact 324 (e.g., "Security Artifact 2") includes a security certificate for accessing objects 1 and 2. In some embodiments, a security artifact may be data (e.g., application data) related to an object (e.g., an application). The data may be used to secure access to the object or related to functions performed for the object.

b. Version Management of Security Artifact Archives

FIG. 4 shows an example of security artifact archives ("A"), such as A1 402 and A2 404, according to some embodiments. Each of security artifact archives A1 402, A2 404 may be defined based on a data structure described with reference to FIG. 3. In this example, security artifact archives A1 402, A2 404 are illustrated as being related to each other as different versions which have been modified with respect to each version. Each of security artifact archives A1 402, A2 404 may be stored (e.g., mapped) in association with one or more of the other security artifact archives A1 402, A2 404. A security artifact archives may be associated with each other using techniques for data referencing or mapping, such as a pointer or a reference to memory.

Security artifact archive A1 402 is an initial version (e.g., "Version 1") as indicated by version data. Security artifact data in security artifact archive 402 includes a reference to multiple security artifacts ("a"), such as security artifact a1 430 and a2 432. Each of security artifacts a1 430, a2 432 may be stored in a security artifact store (e.g., security artifact store 170). Security artifacts a1 430, a2 432 may be identified and associated with security artifact archive A1 402 on the basis of matching one or more attributes indicated by attribute data. In some embodiments, a security artifact archive may reference security artifacts matching each of the attributes specified by the attribute data. A security management system (e.g., security management system 150) may be instructed by a user or may automatically search for security artifacts that satisfy the attributes defined in attribute data.

Archive reference data in security artifact archive A1 402 may include a reference 430 to a next version (e.g., "Version 2") of security artifact archive A1 402. In FIG. 4, the next version is shown as security artifact archive A2 404. A new or different version of a security artifact archive may be generated in response to a variety of conditions. A different version of a security artifact archive may be generated, for example, for a change in a previous version of a security artifact archive. The change may be based on the addition or removal of data, an update to one or more security artifacts referenced to be referenced from the security artifact archive, or a change in security access to an object.

In some embodiments, a security artifact archive may be generated based on a previously generated security artifact archive. For example, security artifact archive A2 404 may be generated based on security artifact archive A1 402.

Security artifact archive A2 404 may be updated to add or remove security artifacts to be managed based on security access indicated by access management data in security artifact archive A2 404. In the example of FIG. 4, security artifact a3 434 may be added as a reference to security artifact archive A2 404. Security artifacts may be identified to be added or remove based on user input, a request from a system (e.g., service provider system 140 or a client system 102), or automatic detection. A security management system may periodically search for security artifacts that meet the attributes indicated by a security artifact archive. Security artifacts that were previously not managed by security artifact archive A1 402 may be identified to be managed by security artifact archive A2 404 based on a change in security access that affects those security artifacts. The change in security access may correspond to an increase or decrease in a level of security. The change in access may be tied to a change in a stage of a lifecycle of a product for which security artifact is used. The change in the stage may demand stronger or different security access. The changes identified above are non-limiting examples, such that a security artifact archive may be generated based on detecting any change in security data or security artifact data in the security artifact archive.

In some embodiments, one or more security artifact archives may be used to manage different versions of security artifacts. An object may have different versions of a security artifact based on a change in security access to the object or a change in attributes for the object (e.g., a change in a stage of a product lifecycle). As a result of the change, the security artifact may change or additional security artifacts may be generated. A new security artifact archive may be generated to manage security access to the object on the basis of the change to a security artifact for the object or an addition or a removal of a security artifact for the object.

A single security artifact archive may include multiple versions of a security artifact and may include version information corresponding to each of those security artifacts. In some embodiments, multiple security artifact archives may be generated, each for a different version of a security artifact. As such, each security artifact archive may include version information for the respective version of the security artifact. Each of the security artifact archives may include a reference to other security artifact archives that manage different versions of a security artifact. In some embodiments, a security artifact archive store may include mappings of different security artifact archives corresponding to different versions of a security artifact. A security management system can use the different security artifact archives to determine access to different versions of an object. For example, a security artifact archive may be chosen based on a version having attributes that qualify for the intended use of the object.

c. Managing Relationships Between Security Artifact Archives

FIG. 5 illustrates a high-level diagram 500 of a mapping of different security artifact archives. Specifically, diagram 500 shows high-level security artifact archives ("security artifact archive family) up to an m number of security artifact archives, such as 502 ("A1"), 504 ("A2"), . . . 506 ("Am"). In certain embodiments, security artifact archives may be organized in a hierarchical manner. For example, a hierarchical data structure, e.g., a tree data structure, may be used to organize a relationship of security artifact archives. In the examples shown, each of A1 502 and A2 504 may be define to manage a set of security artifacts, such as one or more of security artifacts denoted by lower case "a" up to an n number of security artifacts. Some security artifacts in a set of security artifacts of a family may be shared with other security artifact archive families.

In the example shown, A1 502 is a security artifact archive having references to security artifacts a1 510 and a2 512. A2 504 is a security artifact archive having references to security artifacts a2 512, a3 514, and a4 516. In some embodiments, a security artifact archive may be defined to have security artifacts for different types of objects, such as an application and data. A security artifact archive may be defined such that security artifacts may be shared between different security artifact archives because the security artifact may be used for the same object (e.g., an application). For example, different security artifact archives A1 502, A2 504 may be created for different features of the same application, such that each of security artifact archives may share some security artifacts common to those features. In another example, different security artifact archives A1 502, A2 50 may be created for different versions, where the versions correspond to a change in an object, a change in a security artifact, or a change in any of the other security data. For example, when a security artifact a1 510 changes in A1 502, A2 504 may be created to include a2 512, which remains the same, and new security artifacts a3 514 and A4 516. Therefore, security artifact archives A1 502 and A2 504 may be part of a security artifact archive family 520. A security artifact may change due to a change in access (e.g., a change in security access policy). A security artifact archive Am may be created for security artifacts a4 516 up to an n number of security artifacts an 518.

By generating multiple security artifact archives, security artifacts can be managed more effectively to account for different features of applications, changes in security access, and relationships between security artifacts. The relationship between security artifact archives can be used to quickly determine security access for an object. The security artifact archives can be provided to a client system or a provider to manage relationships and changes in security.

In some embodiments, security artifact archives can be mapped or related to one another to aid in the management of security artifacts for a family. For example, A1 502 may be associated with A2 504 as being in the same family 520 or securing access for a related object. Security artifact archives may be associated with one another in a hierarchical manner to account for different versions and/or a relationship of objects (e.g., objects for an application).

IV. Processes for Managing Security Artifacts for Applications

FIGS. 6-8 provide flowcharts illustrating processes for managing security artifacts according to some embodiments of the present invention. The security artifacts may correspond to one or more objects in an enterprise computing environment. For purposes of illustration, FIGS. 6-8 are described with respect to some embodiments in which security artifacts are managed for objects such as applications. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in FIGS. 6-8 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, security management system 150 of FIG. 1 can implement the processes described with reference to any of FIGS. 6-8. Any of the processes may be implemented as a service. The service can be provided to client systems and service providers that provide access to objects.

The particular series of processing steps in FIGS. 6-8 is not intended to be limiting. Other sequences of steps may also be performed according to alternative embodiments. For example, alternative embodiments of the present invention may perform the steps outlined above in a different order. Moreover, the individual steps illustrated in FIGS. 6-8 may include multiple sub-steps that may be performed in various sequences as appropriate to the individual step. Furthermore, additional steps may be added or removed depending on the particular applications. While processing depicted in FIGS. 6-8 is with respect to a single application, such processing may be performed for several applications. While processing depicted in FIGS. 6-8 is with respect to a single security artifact archive, such processing may be performed for several security artifact archives, some or all of which may be related, such as in a hierarchical fashion. One of ordinary skill in the art would recognize many variations, modifications, and alternatives.

Now turning to FIG. 6, flowchart 600 is shown illustrating a process for providing a security artifact archive to an application to enable the application to manage security for accessing the application at an appropriate level. This process decouples management of security for an application away from service providers and client systems to a centralized access management system, e.g., security management system 150 of FIG. 1. The centralized management system can ensure security and compliance of access using security artifacts and can better manage changes in access throughout a life cycle of a product or service.

Flowchart 600 begins at step 602 by identifying one or more objects, such as applications, for which to manage security. Security may be managed for objects by managing security artifacts according to techniques disclosed herein.

A system, such as security management system 150, may implement flowchart 600 to provide a service that manages security of artifacts for applications that have been identified for the service. Applications may be identified in a variety of ways, such as based on information received from a service provider or a client requesting the service. For example, a request is received (e.g., received from service provider 140) to manage security for use of an application by a user. The request may include information identifying the application, such as an application identifier and/or any other information about the application. The application(s) for which to manage security may be identified based on the information about an application (e.g., an application identifier) stored by the system for a security service.

A request may be received as a subscription request for one or more objects. For example, a client system may request security artifact archives for an application. The request may indicate criteria for the subscription. Security artifact archives may be provided in a security artifact archive for the application according to the subscription. The subscription may be provided based on a schedule. The schedule may be based on a life cycle of the application, user criteria, changes in the object (e.g., the application), or any other detectable changes in access to the object.

In some embodiments, a security management system may store information about applications for which a security service is to be provided. The information may be associated with the service that is provided. The security management system can determine the service to provide an application based on querying for the information about the features of the service stored in associated with the application.

In some embodiments, an application may be identified to be managed for security on the basis of a relationship of the application to a security artifact archive. For example, a security artifact archive may be stored for managing a security artifact (e.g., a security certificate) for multiple applications. Any security artifact archives can be searched to determine whether a particular security artifact archive can be used to manage security for an application that is not already associated with the particular security artifact archive. For example, security artifact archive may be assessed to determine whether its security artifact (e.g., a security certificate) is applicable for managing access to an application. An application not already associated with a security artifact archive may identified to be associated with the security artifact archive based on determining that the security artifact archive can be used to manage security for the application. As such, when a security management system becomes aware of a new application for which security is to be managed, security artifact archives may be searched to identify a security artifact archive that can be used to manage security for the new application. A security artifact archive may be identified as matching based on matching one or more of the data types (e.g., attribute data or object data) in a security artifact archive with the application.

At step 604, one or more security artifacts are identified as being related to security for an application (e.g., the application identified at step 602). A security artifact repository (e.g., security artifact store 170) may be queried to identify security artifacts for managing security of the application. Security artifacts may have been identified as being associated with the application on the basis of having security data for securing access to the application. In some embodiments, some or all of the security artifacts may be stored in the security artifact repository in association with one or more attributes related to managing security using those security artifacts. The security artifact repository may be queried based on one or more attributes to identify security artifacts that relate to security that can be applied to securing access to an application (e.g., the application identified at step 602).

In at least one embodiment, a security management system can perform queries on a security artifact store. A query may be driven by user input from a client device and/or may be automated. A query may be initiated by a command defined by one or more attributes by which to search for security artifacts. Attributes may include an object name, an object type, or information about one or more features of an application. In some embodiments, a query may be facilitated through a graphical interface enabling a user to specify information such as a product, a feature, a service, an application, or any other information identifying an object in an enterprise computing environment.

In at least one embodiment, one or more security artifacts may be received from a source (e.g., service provider 140 or client system). For example, a security management system 150 may receive security artifacts from a source external to security management system 150. In the case of an application, the security management system may query a provider of the application for security artifacts to assist the provider with management of security. In some embodiments, a security management system can submit a request to an external source (e.g., service provider 140) for security artifacts related to a particular object (e.g., an application). The request may include one or more criteria, e.g., the name or type of an object. In response, the external source may provide information about the object. Information about an object may identify the security artifacts identified based on the criteria in the request. For example, the information may include the identified artifacts or a location where the security artifacts can be accessed from.

Information obtained from the external source may also identify the objects protected by the identified security artifacts. The information may be the criteria of the objects for which the security artifacts protect. For example, the information may identify the object or a version associated with the object.

At step 606, security access is determined for managing access to an application (e.g., the application identified at step 602) by a user. The security access for an application may be determined with respect to the security artifacts for the application. The security artifacts may include or may be associated with information that indicates how security is to be managed for the application using the security artifact. The information may indicate how to control access to the application, who has access to the application, what access is permitted and/or denied for the application, and other features relates to controlling access to the application. For example, a security artifact may include or be associated with one or more policies (e.g., an access policy) for use of the security artifact. In some embodiments, security artifacts received from an external source may include information (e.g., an access policy) that defines security access using the security artifact.

In some embodiments, security access to an application may be determined based on access management information. Access management information may include policies or other data related to accessing objects in a computing environment. The access management information may indicate how to control access to the application, who has access to the application, what access is permitted and/or denied for the application, and other features relates to accessing the application. Access management information may be obtained from an access management system, such as access manager 152 (e.g., Oracle Access Manager provided by Oracle Corporation). The access management information may be obtained from a user, such as through a client system. Access management information may be stored in a data store, such as access management data 166, of a security management system. The access management information may be associated with or may indicate information identifying objects for which access is to be managed. For example, a policy in the access management information may be defined for one or more security artifacts for multiple, different applications.

At step 608, a security artifact archive is generated for one or more applications for which to manage security. A security artifact archive may include security data. The security data may be generated based on access management information about the security access. The security artifact archive may include security artifact data identifies one or more security artifacts. In some embodiments, a security artifact archive may include security artifacts.

In some embodiments, a security artifact archive may be generated with some of the security artifacts identified at step 604. Some or all of the artifacts generated in a security artifact archive may be related. Security artifacts may be related as being used to control access to the same object. Security artifacts may be identified as related based on access management information. In some embodiments, security artifacts may be identified as being related based on information stored in or associated with those security artifacts. For example, security artifacts may include information indicating an application for which those security artifacts correspond to. Multiple security artifact archives may be generated, each security artifact archive being generated for a different one or more of the identified security artifacts.

Multiple versions of a security artifact archive may be generated. A security artifact archive may have different versions based on changes to any of the data in a security artifact archive. For example, different versions of a security artifact archive may be generated for changes in security access based on a security artifact archive. Each of the versions of a security artifact archive may be stored with information about the version.

At step 610, a security artifact archive is stored. For example, a security artifact archive may be stored in an artifact archive store (e.g., security artifact archive store 162). A security artifact archive may be stored in association with information about an object whose access is controlled by a security artifact identified by the security artifact archive. For example, a security artifact archive may be stored in association with an identifier of the object (e.g., an application identifier). A security artifact archive may be stored in an artifact archive store with information about an object (e.g., an identifier). The information about the object may reference another data store, such as an object-specific data store (e.g., application data 164) storing additional information about the object. For example, the additional information may include details, such as a version information and tags about the object.

A security artifact archive may be stored in association with a version identifier corresponding to an object whose access is controlled by a security artifact identified by the security artifact archive. The version identifier may correspond to a version of the object, where the object has different versions. The version identified may be obtained from an object-specific data store that stores information about the object. In some embodiments, the version identifier may also be included in the security data of the security artifact archive. The version identifier may be further used to associate, e.g., map, a security artifact archive to additional data about the object.

In some embodiments, the security artifact archive may be associated with an object identifier for the object that is controlled using the security artifact archive. For example, the security artifact archive may be stored in association with an object identifier, such as an application identifier, when the object is an application. A security artifact archive may be stored in association with a group identifier of objects whose access is controlled by the security artifact archive.

At step 612, the generated security artifact archive may be transmitted to a system that can manage access to an object (e.g., an application) using the security artifact archive. The system may be configured to use the security artifact archive to manage access to the application. The security artifact archive may be transmitted in response to a request (e.g., request at step 602) or based on a subscription. For example, the security artifact archive may be transmitted as a push response or a pull response.

In at least one embodiment, the generated security artifact archive may be transmitted to a system (e.g., a service provider system 140) that provides the application to a client system. The system can be enabled to use the security artifact archive to manage security access to the application for multiple client systems.

In some embodiments, the generated security artifact archive may be transmitted to a client system. The security artifact archive may be sent to the client system to be provided to the application. The security artifact archive may be used by the application or the client system acting on behalf of the application to manage security for the application. Security access may be managed using the security artifacts data and the security data included in the security artifact archive.

In some embodiments, one or more additional applications may identified as having security access that can be managed by the security artifact archive. A security management system can determine that one or more applications may be accessible using the security artifacts in the security artifact archive. The determination may be based on security access indicated by access management data. The applications may be identified as being of the same type of object and/or having attributes that match with security data in the security artifact archive. Based on identifying the applications, each of the applications may be stored in association with the version identifier originally stored in association with the security artifact archive. The security artifact archive may be stored in association with an application identifier for each of the applications may be stored in association with an application identifier. The security artifact archive may then be transmitted to each of the applications. Security artifact archive may be transmitted to a system that manages access to an object. Security artifact archives may be transmitted with a version identifier, to enable the system to manage different versions of the security artifact archives. In some embodiments, a system may manage security artifact archives in a data store for access at a later time.

Each of the applications may operates to manage security for accessing each of the applications based on the security artifact data and the security access in the security data of the security artifact archive. A similar process may be performed for other objects whose security access can be controlled using the security artifact archive.

V. Search and Retrieval of Security Artifacts

FIG. 7 depicts a flowchart 700 illustrating a process for accessing a security artifact archive for an object. Flowchart 700 begins at step 702 by receiving a request for one or more security artifact archives of an object, such as an application. For example, security management system 150 may receive a request for the security artifact archive(s) for an object. The request may be received from an entity that manages access to the object. For an object having access management decoupled, the entity managing access may be searching for security artifacts and associated data for managing the access. The entity managing access may be the security management system, a service provider, or a client system. In some embodiments, the request may be received from a client system, which submits the request on behalf of an object. The request may be submitted by the object, such as an application, but may be transmitted by the client system providing the object.

The request may be in the form of a query with attributes identifying the security artifacts that are being sought. The attributes may include a type of object, a user-defined tag, an object name, a version, a product associated with an object, a type of access, or other attributes related to an object for which security is to be managed. In some embodiments, the request may include an identifier of a security artifact previously identified. The entity sending the request may provide information (e.g., an identifier for a security artifact archive) that can be used to identify the security artifact archive being sought.

In some embodiments, a request may be received as a request for a subscription. The subscription may be as specific as the object being controlled. A request for a subscription may include criteria for the subscription, in particular the objects being controlled and any other aspects related to managing security of the objects. A request may ask for more security artifacts than accessible to the entity sending the request. As such, security management system 150 can determine access of the entity, which may a different level of access than what is requested. Determining access for the entity may include determining authorization of the requestor.

At step 704, authorization for the request of a security artifact archive is determined. Authorization of the request may be determined to prevent unauthorized entities from accessing a security artifact. Authorization may be determined based on the entity requested the security artifact archive. Information include in the request or determined based on the request can be used to identify the entity for authorization. In some embodiments, a request may include information that identifies or can be used to identify an entity that seeks a security artifact archive. For example, the information may include an identification of the entity or the user requesting the security artifact archive using the entity. Information in the request (e.g., a query) itself may be used to identify the subject for which access is sought. For example, the security artifacts sought may be used to determine the level of security for authorization to access those security artifacts. The attributes may be used to determine the scope of access sought by the request. The scope may be used to determine the level of authorization required for the request. Although shown as occurring before step 706, authorization may be determined after security artifact archives are identified for the request. Authorization may be determined based on those security artifact archives identified for the request.

In some embodiments, an access management system (e.g., access manager 152) may be requested to determine authorization for the request. Authorization may be determined based on a previous authorization. For example, security management system 150 may provide a single sign-on (SSO) feature to an entity enabling SSO access for requests upon an initial authorization of an entity. Authorization may be determined by a sequence of communications with the entity requesting the security artifact archive. The sequence of communications may be performed to obtain credential information, which is used to determine authorization.

Authorization may be specific to a security artifact archive, or a collection of security artifact archives. Authorization may be determined for a collection of security artifact archives that may include one or more security artifact archives being requested. Access to the collection may enable authorization to access the security artifact archives being requested. Authorization for a collection of security artifact archives may be based on the authorization collectively to access each of the security artifact archives in the collection. In some embodiments, authorization may be determined for a subscription and the level of access to determine for the subscription. Access to security artifacts may be vary depending on the access requested and the access permitted to the entity.

At step 706, one or more security artifact archives are identified based on the request. As described above, a request may include information to identify the security artifact archive(s) being requested. The information may include an identifier of the requestor and other information identifying the security artifact archives that are sought. The requestor identifier can be an application name, a group name, or other identifier. Information identifying the security artifact archives sought may include a version identifier or some other identifier to determine the version of the security artifact archives. The version identifier can indicate a particular version (e.g., by name or number), can indicate a "latest" version, or can indicate a default version. In some embodiments, if no version is specified, the default version is automatically selected.

A data store (e.g., security artifact archive store 162) may be searched based on the security artifact archive (s) identified in the request. In some embodiments, an internal query may be generated based on the information in the request. A query may be performed of the data store to identify security artifact archives that satisfy the request. A query of the data store may product a result with information identifying (e.g., security artifact archive identifiers) security artifact archives that satisfy the search. In some embodiments, the security artifact archives may be identified based on the authorization determined for the request.

In some embodiments, one or more security artifact archives may be generated based on the request. The security artifact archive(s) may be generated when the request cannot be satisfied. For example, the security artifact archive(s) may be generated when no security artifact archive is found in the data store.

At step 708, the identified security artifact archive(s) are retrieved from the data store. The security artifact archives may be retrieved from a data store using the information identifying the security artifact archives determined at step 706.

At step 710, the retrieved security artifact archives are transmitted. A response may be generated to identify the security artifact archives. The response may be transmitted to the entity requesting the security artifact archives. In some embodiments, a response may include information identifying a location of the security artifact archive(s).

VI. Managing Security Artifacts for Changes

Flowchart 800 begins at step 802 by identifying a security artifact archive associated with a first version for multiple applications. As explained above, a security artifact archive may be stored in association information about the object(s) for which security access is managed using the security artifact archive. The information may include a version identifier indicating a version of the security artifact archive. Security artifact archives may be stored in association with multiple versions, each identified by a version identifier. As such, multiple security artifact archives may be generated for different versions. Each version of a security artifact archive may be generated for a change in security access.

At step 804, a change in the security access for multiple objects (e.g., applications) may be detected. The change may correspond to a change in the security data for a security artifact archive. For example, a change in the security data may be a change in a policy identified in the security data. The change may correspond to a change in the object. A change in an object may be a change in the environment that an object is accessed or a change in a version of the object. For example, a change in a version of an application may be considered a change in the application. Security access may be affected by the change in the version of the object. One or more of the objects may have a change in version.

A change may be detected in a variety of ways. A security management system may receive a communication that indicates a change in the data of an object associated with a security artifact. For example, a request may be received that indicates a change in the version of an object. The change in version may affect a change in security access to that object. As such, the security artifact archive may be updated to reflect the change in security access. The security management system may receive an updated security artifact for the object. The received security artifact may indicate a change in security access for the object.

A security management system detect a change in the data of one more security artifact archives. The data may be associated with policies. In one example, the security management system may receive information or can determine that one of the policies associated with the security data of a security artifact archive has changed. A change in the security access to the plurality of applications may include a change in a level of authentication. A change in the security access to the plurality of applications may include a change in a security artifact identified by the security artifact data for the first security artifact archive. A change in the security access to the plurality of applications may include a change in an access policy indicated by the security data.

In some embodiments, change in the security access for an object may be based on a life cycle of a product involving the object. For example, security access to an application may change based on a life cycle of a product providing the application. Security access may change during stages of development, deployment, and use, such that more or fewer security artifacts may be required for access. Access provided by a security artifact may change, such that the security artifact is updated to accommodate a change in security access. Therefore, detecting a change in the security access for accessing an object may include determining a change in the life cycle of a product for the object. A change ins security access may be detected based on a change in the life cycle of the product.

At step 806, a new security artifact archive is generated for a second version of objects, such as application. The security artifact archive is generated based on the detected change. The new security artifact archive may be based on modifying the security artifact archive for which change is detected. For example, the new security artifact archive may be generated based on modifying the security artifact archive, such as modifying a security artifact or the security data. In some embodiments, an entirely new security artifact archive may be generated. Data from the identified security artifact archive may be replicated in the new security artifact archive. New data corresponding to the detected change may be added to the new security artifact archive.

At step 808, the new security artifact archive is stored. The new security artifact archive may be stored in different manners, depending on the basis for generating the new security artifact archive. In at least one embodiment, the new security artifact archive may be generated as a different version of the security artifact archive identified at step 802. As such, the new security artifact archive may be stored with information (e.g., an identifier) as to the basis for the detected change. For example, the new security artifact archive may be stored ins association with a version identifier of the plurality of objects for which security access is managed. In some embodiments, the new security artifact archive may be modified or generated with the identifier.

At step 810, the new security artifact archive may be transmitted. The new security artifact archive may be transmitted to a computing system that provides access to the objects for which security access is managed. For example, when security access for applications is managed by a provider system that provides access to those applications, the new security artifact archive is transmitted to the provider system.

In some embodiments, one or more additional objects may be identified as sharing all or some of the security artifacts in a security artifact archive. The objects may be identified based on having one or more attributes that match the security data in the security artifact archive. The most current security artifact archive (e.g., the new security artifact archive) may be stored in association with a version identifier of the most current security artifact archive. A message may be transmitted to a system (e.g., service provider 140 or client system 102) that provides access to the objects to indicate that the most current security artifact archive are to be controlling using the most current security artifact archive. The most current security artifact archive may be transmitted to the computer system.

VII. Computing Environments

Figure 9:
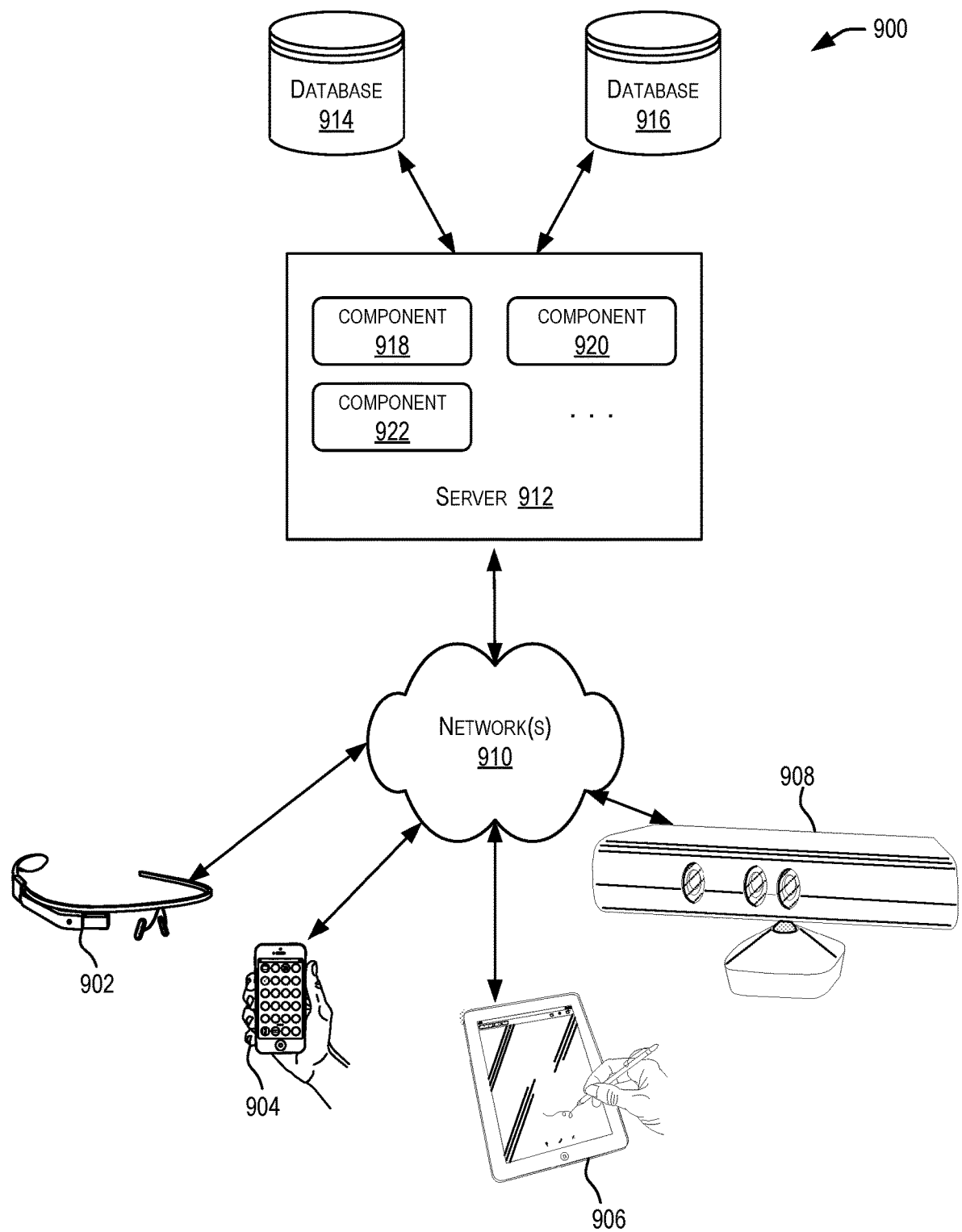
FIG. 9 depicts a simplified diagram of a distributed system for implementing an embodiment.

FIG. 9 depicts a simplified diagram of a distributed system 900 for implementing an embodiment. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications such as services and applications that may manage security artifacts. In certain embodiments, server 912 may also provide other services or software applications can include non-virtual and virtual environments. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

Client computing devices 902, 904, 906, and/or 908 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 910.

Although distributed system 900 in FIG. 9 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various embodiments, server 912 may be adapted to run one or more services or software applications described in the foregoing disclosure. For example, server 912 may correspond to a server for performing processing as described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. These databases may provide a mechanism for storing information such as user interactions information, usage patterns information, adaptation rules information, and other information used by embodiments of the present invention. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle that are adapted to store, update, and retrieve data in response to SQL-formatted commands.

Figure 10:
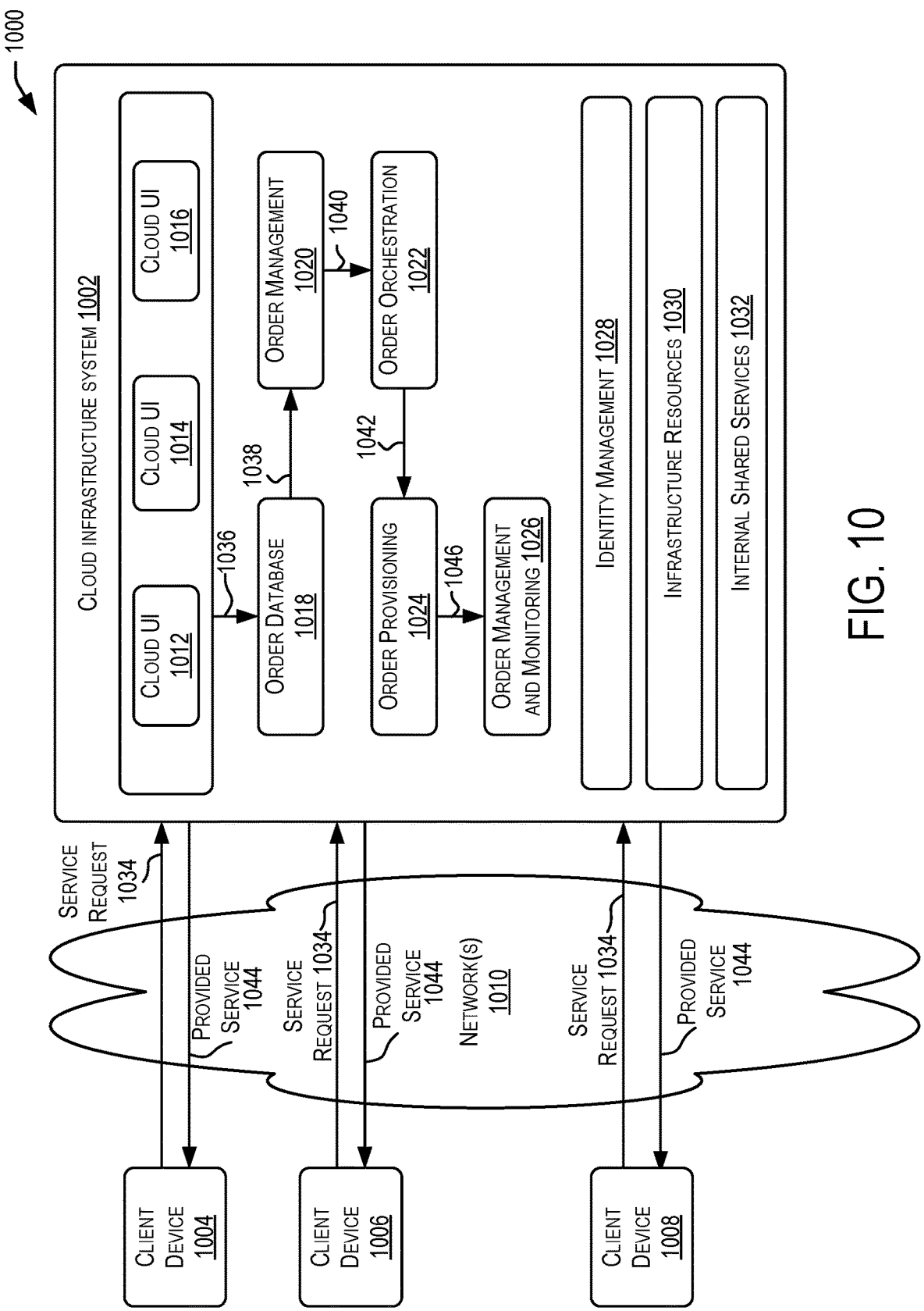
FIG. 10 illustrates a simplified block diagram of one or more components of a system environment in which services may be offered as cloud services, in accordance with an embodiment of the present disclosure.

In some embodiments, a cloud environment may provide one or more services for managing security artifacts. FIG. 10 is a simplified block diagram of one or more components of a system environment 1000 in which services may be offered as cloud services, in accordance with an embodiment of the present disclosure. In the illustrated embodiment in FIG. 10, system environment 1000 includes one or more client computing devices 1004, 1006, and 1008 that may be used by users to interact with a cloud infrastructure system 1002 that provides cloud services, including services for managing security artifacts. Cloud infrastructure system 1002 may comprise one or more computers and/or servers that may include those described above for server 912.

It should be appreciated that cloud infrastructure system 1002 depicted in FIG. 10 may have other components than those depicted. Further, the embodiment shown in FIG. 10 is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for client computing devices 902, 904, 906, and 908. Client computing devices 1004, 1006, and 1008 may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between client computing devices 1004, 1006, and 1008 and cloud infrastructure system 1002. Each network may be any type of network familiar to those skilled in the art that can support data communications using any of a variety of commercially-available protocols, including those described above for network(s) 910.

In certain embodiments, services provided by cloud infrastructure system 1002 may include a host of services that are made available to users of the cloud infrastructure system on demand. In addition to services related to managing security artifacts, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle Corporation) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform, and other resources.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 to enable provision of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in FIG. 10, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In an exemplary operation, at step 1034, a customer using a client device, such as client computing devices 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI) such as cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

At step 1036, the order information received from the customer may be stored in an order database 1018. If this is a new order, a new record may be created for the order. In one embodiment, order database 1018 can be one of several databases operated by cloud infrastructure system 1018 and operated in conjunction with other system elements.

At step 1038, the order information may be forwarded to an order management module 1020 that may be configured to perform billing and accounting functions related to the order, such as verifying the order, and upon verification, booking the order.

At step 1040, information regarding the order may be communicated to an order orchestration module 1022 that is configured to orchestrate the provisioning of services and resources for the order placed by the customer. In some instances, order orchestration module 1022 may use the services of order provisioning module 1024 for the provisioning. In certain embodiments, order orchestration module 1022 enables the management of business processes associated with each order and applies business logic to determine whether an order should proceed to provisioning.

As shown in the embodiment depicted in FIG. 10, at step 1042, upon receiving an order for a new subscription, order orchestration module 1022 sends a request to order provisioning module 1024 to allocate resources and configure resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. This enables order orchestration module 1022 to be isolated from implementation details, such as whether or not services and resources are actually provisioned on the fly or pre-provisioned and only allocated/assigned upon request.

At step 1044, once the services and resources are provisioned, a notification may be sent to the subscribing customers indicating that the requested service is now ready for use. In some instance, information (e.g. a link) may be sent to the customer that enables the customer to start using the requested services.

At step 1046, a customer's subscription order may be managed and tracked by an order management and monitoring module 1026. In some instances, order management and monitoring module 1026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1000 may include an identity management module 1028 that is configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

Figure 11:
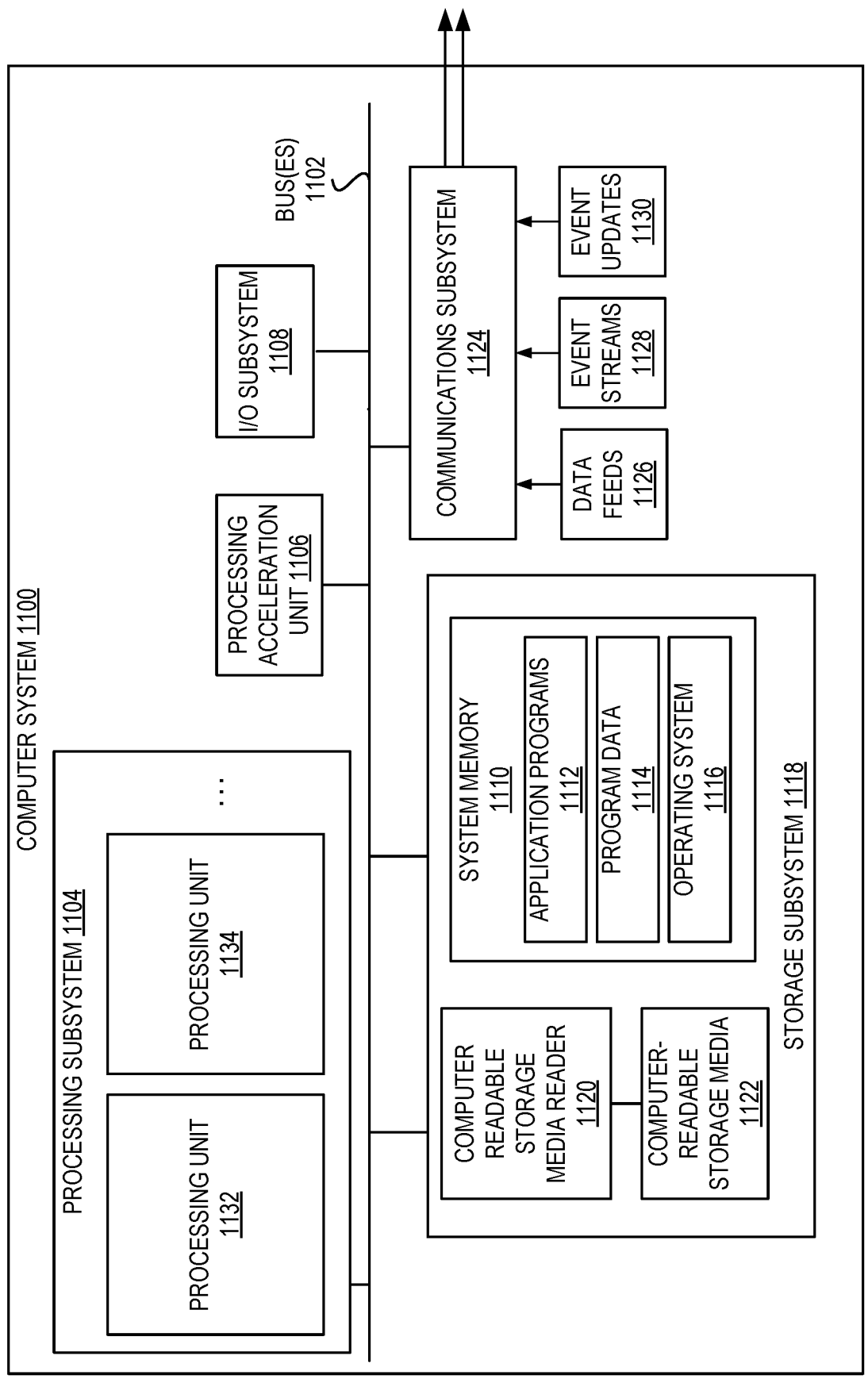
FIG. 11 illustrates an exemplary computer system that may be used to implement an embodiment of the present invention.

FIG. 11 illustrates an exemplary computer system 1100 that may be used to implement an embodiment of the present invention. In some embodiments, computer system 1100 may be used to implement any of the various servers and computer systems described above. As shown in FIG. 11, computer system 1100 includes various subsystems including a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above for managing security artifacts.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present invention.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client computing devices via the Internet for receiving and sending information from and to the client computing devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1102.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method for managing security of applications, the method comprising:
   receiving, by a security management computer system, a request to manage security of an application, wherein the request is received from a system that provides the application for a plurality of users;
   identifying, by the security management system, one or more security artifacts that apply to the application from among a plurality of security artifacts that are stored in a data store of the security management system;
   generating, by the security management computer system, a security artifact archive for the application, the security artifact archive comprising:
      security artifact data that identifies the one or more security artifacts stored in a data store of the security management computer system; and
      security data comprising:
         an access policy that indicates security access for accessing the application; and
         attribute data indicating one or more attributes of the application;
   responsive to the request, transmitting, by the security management computer system, the security artifact archive to the application, wherein the application manages access to the application using the security artifact data and the security access in the security data of the security artifact archive and using the one or more security artifacts stored in the data store and managed by the security management computer system;
   receiving, by the security management computer system, a second request for one or more security artifact archives from a device of a requestor, the second request comprising at least one of the one or more attributes of the application;
   determining, by the security management computer system, authorization for the second request; and
   transmitting, by the security management computer system, the security artifact archive for the application to the device of the requestor based on the at least one of the one or more attributes of the application.

2. The method of claim 1, further comprising:
   identifying, by the security management computer system, the one or more of the plurality of security artifacts, the one or more security artifacts related to security for accessing the application, wherein the security management computer system is in a secure zone protected by one or more security measures; and
   wherein the application is outside the secure zone.

3. The method of claim 1, further comprising:
   storing, by the security management computer system, the security artifact archive in association with an application identifier that identifies the application in a security artifact archive repository.

4. The method of claim 1, wherein the request to manage security of the application is a subscription request and the security artifact archive is provided according to the subscription.

5. The method of claim 1, further comprising:
   identifying, by the security management computer system, the security artifact archive for the application based on the at least one of the one or more attributes; and
   retrieving, by the security management computer system, the security artifact archive for the application.

6. The method of claim 1, further comprising:
   detecting, by the security management computer system, a change in the security data of the security artifact archive;
   generating, by the security management computer system, a new security artifact archive based on the detected change in the security data of the security artifact archive; and
   storing, by the security management computer system, the new security artifact archive.

7. The method of claim 6, wherein the new security artifact archive is stored as a different version of the security artifact archive.

8. A security management system comprising:
   one or more processors; and
   a memory accessible to the one or more processors, the memory storing instructions which, upon execution by the one or more processors, cause the one or more processors to:
      receive a request to manage security of an application, wherein the request is received from a system that provides the application for a plurality of users;
      identify one or more security artifacts that apply to the application from among a plurality of security artifacts that are stored in a data store of the security management system;
      generate a security artifact archive for the application, the security artifact archive comprising:
         security artifact data that identifies the one or more security artifacts stored in a data store of the security management computer system; and
         security data comprising:
            an access policy that indicates security access for accessing the application; and
            attribute data indicating one or more attributes of the application;
      responsive to the request, transmit the security artifact archive to the application, wherein the application manages access to the application using the security artifact data and the security access in the security data of the security artifact archive and using the one or more security artifacts stored in the data store and managed by the security management system;

receive a second request for one or more security artifact archives from a device of a requestor, the second request comprising at least one of the one or more attributes of the application;

determine authorization for the second request; and transmit the security artifact archive for the application to the device of the requestor based on the at least one of the one or more attributes of the application.

9. The security management system of claim 8, wherein the system that provides the application for a plurality of users comprises a service provider system.

10. The security management system of claim 9, wherein the device and the requestor are different from the service provider system.

11. The security management system of claim 8, wherein the memory stores additional instruction that cause the one or more processors to:

submit a query to the data store comprising the one or more attributes of the application; and receive the one or more security artifacts as a result of the query.

12. The security management system of claim 8, wherein the memory stores additional instruction that cause the one or more processors to:

receive additional security artifacts from a source external to the security management system.

13. The security management system of claim 8, wherein the security data further comprises object data that indicates objects for which access is controlled by the security artifact archive.

14. The security management system of claim 13, wherein the object data comprise a version of the objects.

15. A memory device, having stored thereon computer-readable instructions that, upon execution by one or more processors, cause the one or more processors to:

receive a request to manage security of an application, wherein the request is received from a system that provides the application for a plurality of users;

identify one or more security artifacts that apply to the application from among a plurality of security artifacts that are stored in a data store of the security management system;

generate a security artifact archive for the application, the security artifact archive comprising:

security artifact data that identifies the one or more security artifacts stored in a data store of the security management computer system; and security data comprising:

an access policy that indicates security access for accessing the application;

attribute data indicating one or more attributes of the application; and responsive to the request, transmit the security artifact archive to the application, wherein the application manages access to the application using the security artifact data and the security access in the security data of the security artifact archive and using the one or more security artifacts stored in the data store and managed by the security management system;

receive a second request for one or more security artifact archives from a device of a requestor, the second request comprising at least one of the one or more attributes of the application;

determine authorization for the second request; and transmit the security artifact archive for the application to the device of the requestor based on the at least one of the one or more attributes of the application.

16. The memory device of claim 15, wherein the security data further comprises tags assigned to the security artifact archive.

17. The memory device of claim 15, wherein the security data further comprises a history of the security artifact archive comprising changes, updates, or additions to the security artifact archive.

18. The memory device of claim 15, wherein the security data further comprises a reference to another security artifact archive.

19. The memory device of claim 15, wherein the security artifact data further comprises security credentials for accessing the application.

20. The memory device of claim 15, wherein the security artifact archive is part of a security artifact archive family, wherein the security artifact archive shares a security artifact with a second security artifact archive in the security artifact archive family.

* * * * *

UNITED STATES PATENT AND TRADEMARK OFFICE
CERTIFICATE OF CORRECTION

PATENT NO. : 11,038,861 B2
APPLICATION NO. : 16/211540
DATED : June 15, 2021
INVENTOR(S) : Agarwal et al.

It is certified that error appears in the above-identified patent and that said Letters Patent is hereby corrected as shown below:

On the Title Page

Item (57), Column 2, under Abstract, Line 15, after "destination" delete "may".

In the Specification

In Column 1, Line 66, delete "been" and insert -- be --, therefor.

In Column 3, Line 47, delete "object" and insert -- object. --, therefor.

In Column 5, Line 42, delete "been" and insert -- be --, therefor.

In Column 13, Line 59, delete "Apps." and insert -- apps. --, therefor.

In Column 28, Line 44, delete "ins" and insert -- in --, therefor.

In Column 29, Line 1, delete "ins" and insert -- in --, therefor.

In Column 30, Line 41, delete "infra-red" and insert -- infrared --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*